United States Patent
Tsuboi et al.

(10) Patent No.: US 10,376,122 B2
(45) Date of Patent: Aug. 13, 2019

(54) SELF-PROPELLED ELECTRONIC DEVICE AND TRAVEL METHOD FOR SAID SELF-PROPELLED ELECTRONIC DEVICE

(71) Applicant: Sharp Kabushiki Kaisha, Sakai, Osaka (JP)

(72) Inventors: Masanori Tsuboi, Sakai (JP); Toshihiro Senoo, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 171 days.

(21) Appl. No.: 15/552,380

(22) PCT Filed: Mar. 1, 2016

(86) PCT No.: PCT/JP2016/056248
§ 371 (c)(1),
(2) Date: Aug. 21, 2017

(87) PCT Pub. No.: WO2016/203791
PCT Pub. Date: Dec. 22, 2016

(65) Prior Publication Data
US 2018/0035860 A1    Feb. 8, 2018

(30) Foreign Application Priority Data

Jun. 18, 2015 (JP) ................ 2015-122885

(51) Int. Cl.
A47L 9/28 (2006.01)
G05D 1/02 (2006.01)
A47L 11/40 (2006.01)

(52) U.S. Cl.
CPC ........... *A47L 11/4061* (2013.01); *A47L 9/28* (2013.01); *A47L 9/2805* (2013.01);
(Continued)

(58) Field of Classification Search
CPC .. B25J 5/00; B25J 19/02; G05B 11/01; G05B 13/00; H02P 1/00; H02P 3/00; H02P 5/00;
(Continued)

(56) References Cited

U.S. PATENT DOCUMENTS 8,032,978 B2 * 10/2011 Haegermarck ........... A47L 9/00
15/319
8,521,329 B2 * 8/2013 Park ..................... G05D 1/0227
700/245
(Continued)

FOREIGN PATENT DOCUMENTS

JP    53-110257 A    9/1978
JP    62-63315 A    3/1987
(Continued)

*Primary Examiner* — Antony M Paul
(74) *Attorney, Agent, or Firm* — ScienBiziP, P.C.

(57) ABSTRACT

A self-propelled electronic device comprising: a housing; drive wheels that enable the housing to travel; a travel control unit that controls travel of the housing; and a periphery detection sensor that detects a region around the housing where the device is unable to travel, wherein the drive wheels include a left drive wheel and a right drive wheel which are independently driven, and the travel control unit: causes the left drive wheel and the right drive wheel to move backward in such a manner that an amount of rotation of the left drive wheel is smaller than an amount of rotation of the right drive wheel, when the periphery detection sensor detects that there is a region where the device is unable to travel at front left of the housing; and causes the left drive wheel and the right drive wheel to move backward in such a manner that an amount of rotation of the right drive wheel is smaller than an amount of rotation of the left drive wheel when the periphery detection sensor detects that there is a region where the device is unable to travel at front right of the housing.

7 Claims, 14 Drawing Sheets

(52) U.S. Cl.
CPC .......... *A47L 9/2852* (2013.01); *G05D 1/0227* (2013.01); *A47L 2201/04* (2013.01); *G05D 2201/0215* (2013.01)

(58) Field of Classification Search
CPC ...... H02P 5/52; H02P 6/00; H02P 6/14; H02P 7/00; H02P 23/00; H02P 27/00; H02P 1/24; H02P 1/46; H02P 3/06; H02P 3/18; H02P 27/04; H02P 27/06; H02P 41/00; H02P 8/00; H02P 8/06; H02P 25/08; H02P 25/10; G05D 1/024; G05D 1/0227; G05D 1/0242; G05D 1/0246; G05D 1/0255; G05D 1/027; G05D 1/0272
USPC ......... 318/568.12, 568.16, 560, 400.01, 700, 318/701, 727, 799, 800, 430; 700/245, 700/250, 253; 701/23, 26; 15/246.2
See application file for complete search history.

(56) References Cited

U.S. PATENT DOCUMENTS

| | | | |
|---|---|---|---|
| 9,436,185 B2 * | 9/2016 | Schnittman | G05D 1/0227 |
| 9,457,471 B2 * | 10/2016 | Schnittman | G05D 1/0227 |
| 2005/0021181 A1 | 1/2005 | Kim et al. | |
| 2005/0166357 A1 | 8/2005 | Uehigashi | |

FOREIGN PATENT DOCUMENTS

| | | | |
|---|---|---|---|
| JP | 62-293320 A | 12/1987 |
| JP | 2002-323926 A | 11/2002 |
| JP | 2005-040596 A | 2/2005 |
| JP | 2005-211499 A | 8/2005 |
| JP | 2007-215928 A | 8/2007 |

\* cited by examiner

SELF-PROPELLED ELECTRONIC DEVICE AND TRAVEL METHOD FOR SAID SELF-PROPELLED ELECTRONIC DEVICE

TECHNICAL FIELD

The present invention relates to a self-propelled electronic device and a travel method for the self-propelled electronic device, and more particularly to a self-propelled electronic device having a function of avoiding an obstacle or a downward level difference (downward step), and a travel method therefor.

BACKGROUND ART

Conventionally, there has been known a self-propelled electronic device that performs a job such as cleaning, while autonomously traveling on an indoor space or an outdoor space. The self-propelled electronic device may be provided with an obstacle sensor for detecting an obstacle such as a wall or furniture around the device while traveling, or a floor surface detection sensor for detecting a floor surface to prevent the self-propelled electronic device from falling down a cliff, a downward level difference, or the like.

When the self-propelled electronic device having the above-mentioned function of avoiding an obstacle or a downward level difference detects an obstacle or a downward level difference, it immediately performs an escaping operation in general.

For example, an escaping operation is generally performed such that, when detecting an obstacle ahead of the self-propelled electronic device while autonomously traveling around, the self-propelled electronic device moves backward by a predetermined distance, and when detecting a downward level difference on the rear of the device, the self-propelled electronic device moves forward by a predetermined distance.

Also, as a conventional self-propelled electronic device having a function of avoiding an obstacle, an invention of a self-propelled vacuum cleaner has been proposed which is provided with a collision detection unit that detects a movement of a main body as well as collision of the main body and an external detection unit that is mounted only on the front part of the main body for detecting a situation outside of the main body, wherein, when the collision detection unit detects collision of the main body, a control unit causes the main body to spin by means of a travel unit, detects the surrounding situation of the main body by means of the external detection unit, and corrects a travel course (for example, see Patent Document 1).

There has also been proposed an invention of a robot cleaner provided with a bumper, a protruding obstacle detection unit, and a control unit, wherein the control unit determines whether or not an obstacle is present in response to a signal from the protruding obstacle detection unit, and when an obstacle appears, the control unit changes the traveling direction of a robot main body so as to avoid the obstacle (for example, see Patent Document 2).

CITATION LIST

Patent Document

Patent Document 1: Japanese Unexamined Patent Publication No. 2005-211499

Patent Document 2: Japanese Unexamined Patent Publication No. 2005-40596

SUMMARY OF THE INVENTION

Problem to be Solved by the Invention

However, when the self-propelled electronic device is trapped in a place sandwiched between regions where there is an obstacle, a downward level difference, or the like, in front and rear or on the left and right of the device, for example, a chain of a forward movement and a backward movement occurs, which may often throw the self-propelled electronic device in a situation of being difficult to escape from such a place. In such a situation, the self-propelled electronic device places priority on a predetermined avoiding operation and cannot perform other operations. Therefore, the self-propelled electronic device can never escape from this situation.

The present invention is accomplished in view of the above-mentioned circumstance, and aims to provide a self-propelled electronic device that can efficiently free oneself from a situation in which the device is trapped in a place sandwiched between regions where the device is unable to travel, such as regions where there is an obstacle or a downward level difference, for example, and a travel method for the self-propelled electronic device.

Means for Solving the Problems

The present invention provides a self-propelled electronic device comprising: a housing; drive wheels that enable the housing to travel; a travel control unit that controls travel of the housing; and a periphery detection sensor that detects a region around the housing where the device is unable to travel, wherein the drive wheels include a left drive wheel and a right drive wheel which are independently driven, and the travel control unit: causes the left drive wheel and the right drive wheel to move backward in such a manner that an amount of rotation of the left drive wheel is smaller than an amount of rotation of the right drive wheel, when the periphery detection sensor detects that there is a region where the device is unable to travel at front left of the housing; and causes the left drive wheel and the right drive wheel to move backward in such a manner that an amount of rotation of the right drive wheel is smaller than an amount of rotation of the left drive wheel when the periphery detection sensor detects that there is a region where the device is unable to travel at front right of the housing.

The present invention also provides a travel method for a self-propelled electronic device that causes a housing to travel using a left drive wheel and a right drive wheel which are independently driven, while avoiding a region around the device where the device is unable to travel, the method comprising: causing the left drive wheel and the right drive wheel to move backward in such a manner that an amount of rotation of the left drive wheel is smaller than an amount of rotation of the right drive wheel, when a region where the device is unable to travel is detected at front left of the housing; and causing the left drive wheel and the right drive wheel to move backward in such a manner that an amount of rotation of the right drive wheel is smaller than an amount of rotation of the left drive wheel, when a region where the device is unable to travel is detected at front right of the housing.

Effect of the Invention

The present invention can implement a self-propelled electronic device that can efficiently free oneself from a situation in which the device is trapped in a place sandwiched between regions where the device is unable to travel, such as regions where there is an obstacle or a downward level difference, in front and rear or on the left and right of the device, for example, and a travel method therefor.

MODE FOR CARRYING OUT THE INVENTION

First Embodiment

Hereinafter, the present invention will be described in more detail with reference to the drawings. It is to be noted that the description below is illustrative in all respects, and should not be construed to limit the present invention.

In the first embodiment, a self-propelled vacuum cleaner 1 will be described as one example of the self-propelled electronic device. However, the present invention is applicable to self-propelled electronic devices (for example, a self-propelled ion generator) other than a vacuum cleaner.

Figure 1:
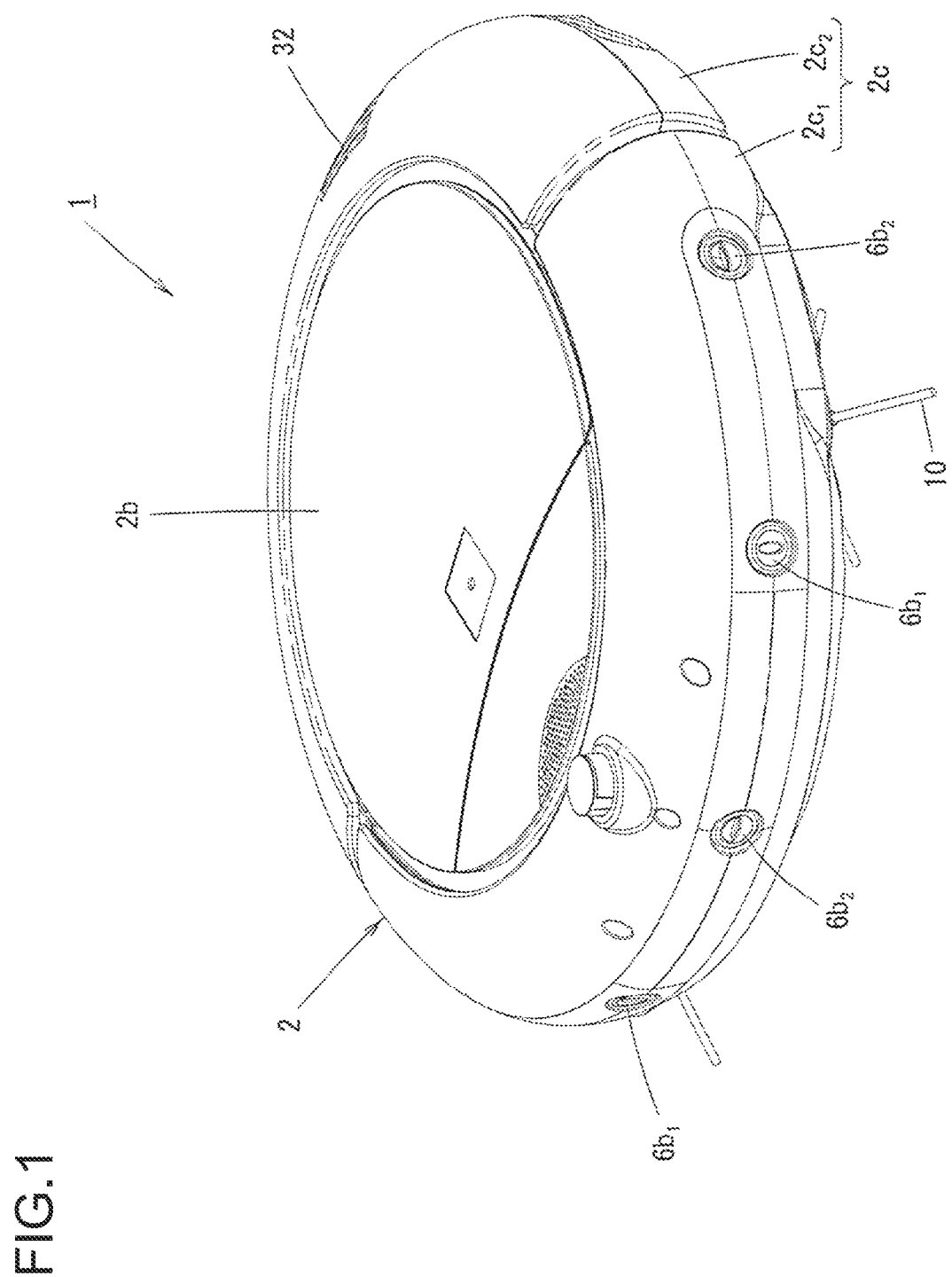
FIG. 1 is a perspective view showing a self-propelled vacuum cleaner according to a first embodiment of the present invention.
Figure 2:
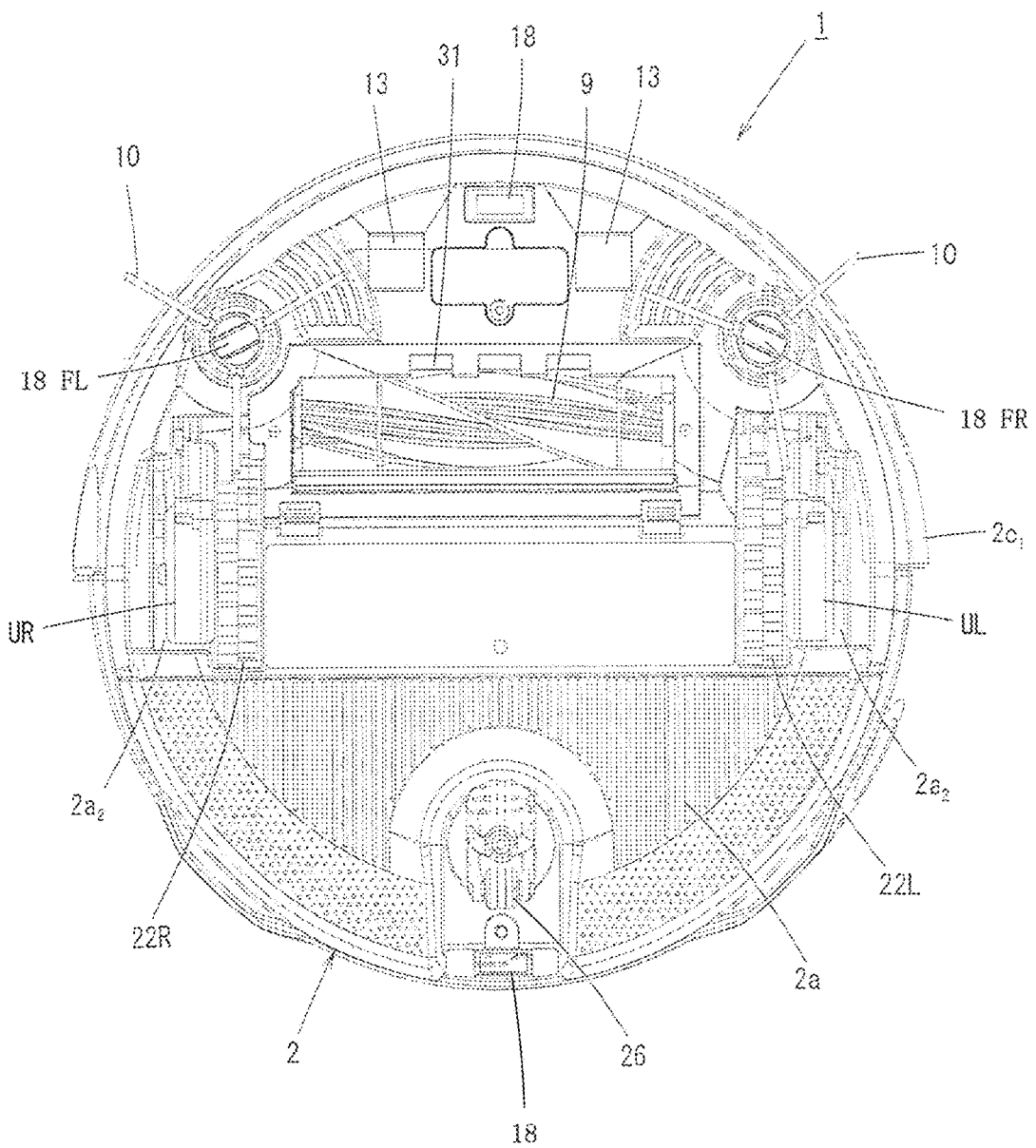
FIG. 2 is a bottom view of the self-propelled vacuum cleaner shown in FIG. 1.
Figure 3:
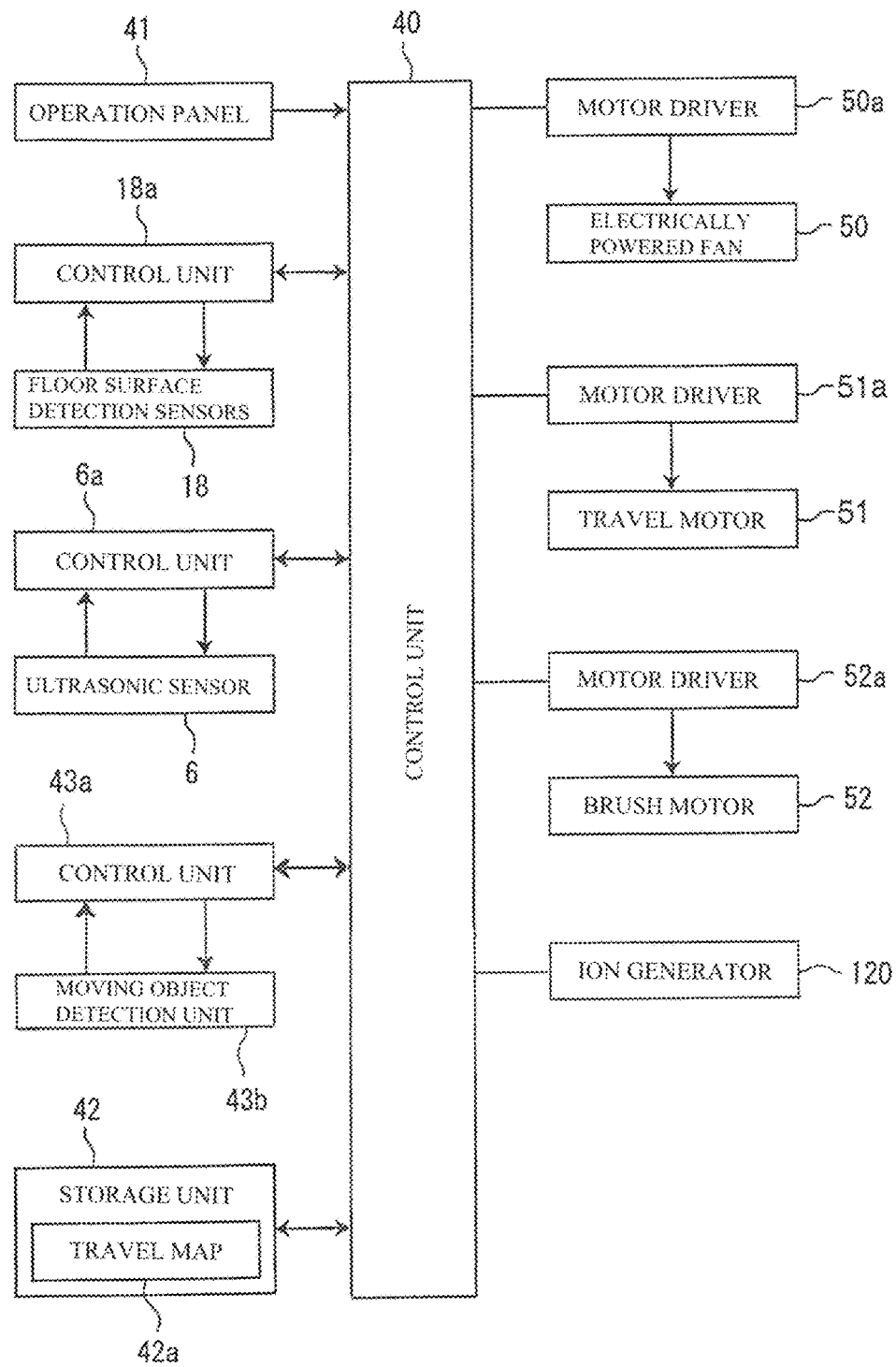
FIG. 3 is a block diagram showing a schematic configuration of a control circuit of the self-propelled vacuum cleaner shown in FIG. 1.
Figure 4:
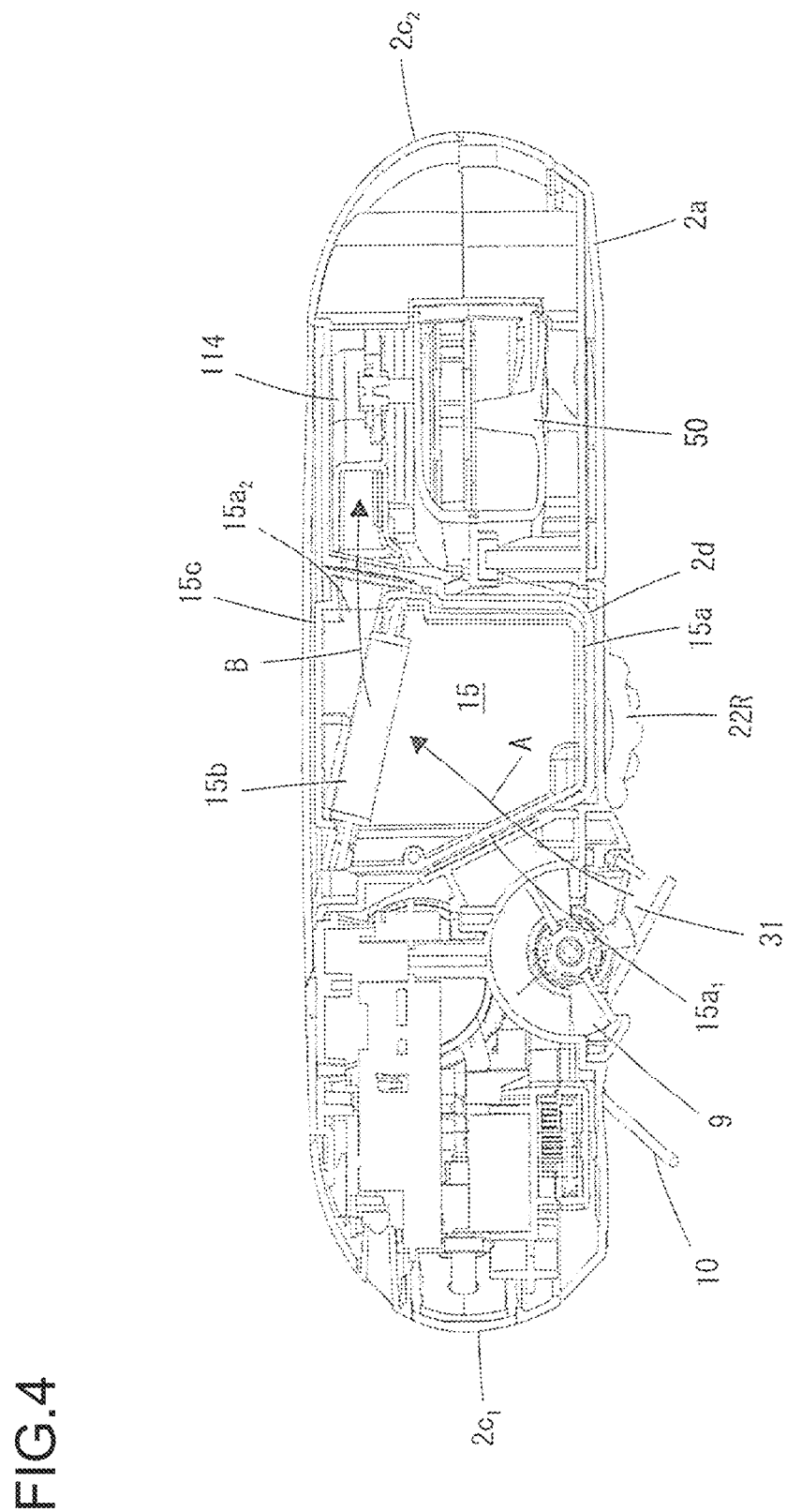
FIG. 4 is a sectional side view of the self-propelled vacuum cleaner shown in FIG. 1.
Figure 5:
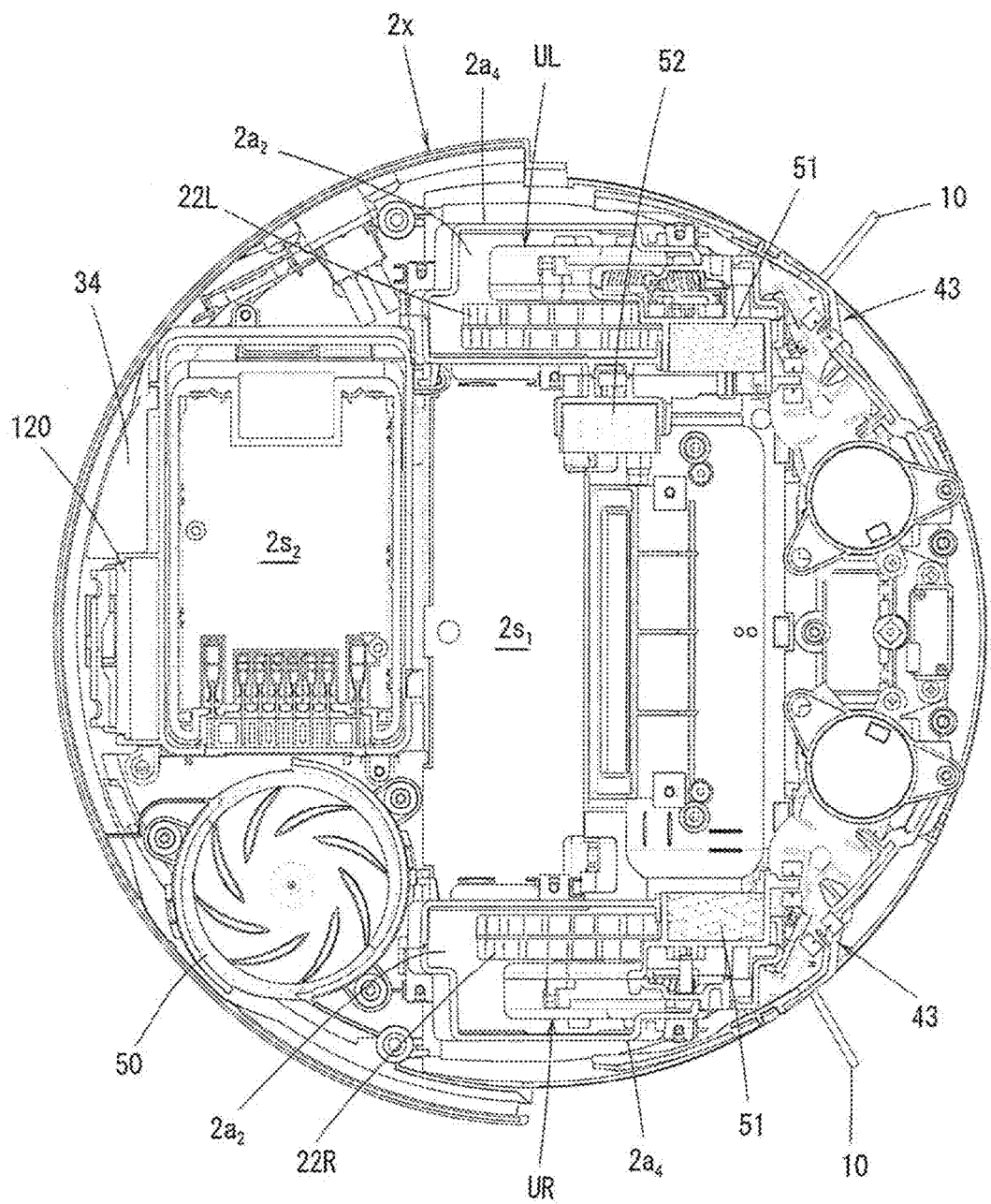
FIG. 5 is a sectional plan view of the self-propelled vacuum cleaner shown in FIG. 1.

FIG. 1 is a perspective view of the self-propelled vacuum cleaner 1 according to the first embodiment of the present invention. FIG. 2 is a bottom view of the self-propelled vacuum cleaner 1 shown in FIG. 1. FIG. 3 is a block diagram showing a schematic configuration of a control circuit of the self-propelled vacuum cleaner 1 shown in FIG. 1. FIG. 4 is a sectional side view of the self-propelled vacuum cleaner 1 shown in FIG. 1. FIG. 5 is a sectional plan view of the self-propelled vacuum cleaner 1 shown in FIG. 1.

The self-propelled vacuum cleaner 1 according to the first embodiment has a disc-shaped housing 2, and includes, inside and outside of the housing 2, components such as a collision detection unit 43, a rotary brush 9, side brushes 10, a dust-collecting box 15a composing a dust-collecting chamber 15, an electrically powered fan 50, a pair of left and right drive wheels 22L and 22R that enables the housing 2 to linearly move forward or backward and to turn in the clockwise direction or in the counterclockwise direction, a rear wheel 26, a pair of left and right charging terminals 13, a control unit 40 including a plurality of floor surface detection sensors 18, electronic device components, and the like, and a battery serving as a drive source for driving the drive wheels 22L and 22R, the rotary brush 9, the side brushes 10, the electrically powered fan 50, and the like.

A "periphery detection sensor" in the present invention is implemented by a moving object detection unit 43b and/or the floor surface detection sensor 18. In addition, a "travel control unit" in the present invention is implemented by cooperation between the control unit 40 and a motor driver 51a.

In the self-propelled vacuum cleaner 1, the part where the rear wheel 26 is mounted is a rear part, a part opposite to the rear wheel 26 is a front part, and a part where the pair of left and right drive wheels 22L and 22R is mounted is an intermediate part. When the self-propelled vacuum cleaner 1 is stopped or is traveling on a horizontal surface, the housing 2 is supported by three wheels which are the pair of left and right drive wheels 22L and 22R and the rear wheel 26. Therefore, in the present specification, a direction of forward movement (frontward) indicates a direction in which the self-propelled vacuum cleaner 1 moves to the front side, a direction of backward movement (rearward) indicates a direction in which the self-propelled vacuum cleaner 1 moves to the rear side, left and right sides indicate a left side and a right side when the self-propelled vacuum cleaner 1 moves forward, and top and bottom sides indicate a top side and a bottom side in a state where the housing 2 is supported by three wheels on a floor surface FL.

The housing 2 has a bottom plate 2a which is circular in a plan view and is provided with a suction opening 31 formed on the front part at a position near the boundary between the front part and the intermediate part, a top plate 2b having a lid which is opened and closed for loading and unloading the dust-collecting box 15a to and from the housing 2, and a side plate 2c which is annular in a plan view and formed along the outer peripheries of the bottom plate 2a and the top plate 2b.

The bottom plate 2a is formed with a pair of left and right openings $2a_2$ for storing a portion of each of the left and drive wheels 22L and 22R in the housing 2. In addition, a support member $2a_4$ is provided around each of the openings $2a_2$ on the inner surface of the bottom plate 2a. Moreover, drive wheels 22L and 22R are respectively built in drive wheel units UL and UR provided with later-described travel motors 51 and drive force transmission mechanisms with gears for transmitting rotational drive force of the travel motors 51 to the respective drive wheels 22L and 22R. The drive wheel units UL and UR are pivotally supported by the support members $2a_4$ through a horizontal axis.

The side plate 2c is configured to be divided into two, a front bumper $2c_1$ and a rear side plate $2c_2$. The rear side plate $2c_2$ is formed with an exhaust opening 32. Hereinafter, the part of the housing 2 except for the bumper $2c_1$ is referred to as a housing main body $2x$.

Inside the housing 2, components such as the travel motors 51, a brush motor 52, the electrically powered fan 50, an ion generator 120, the dust-collecting box 15a, the control circuit, and the battery are provided. The center of gravity position of the housing 2 is placed on the rear part such that the housing 2 can be supported by three wheels which are the pair of left and right drive wheels 22L and 22R and the rear wheel 26. Note that, in FIG. 5, an intermediate space $2s_1$ in the housing 2 is for storing the dust-collecting box 15a, and a rear space $2s_2$ is for storing the battery.

As shown in FIG. 3, the control circuit which performs an operation control for the entire self-propelled vacuum cleaner 1 includes the control unit 40, an operation panel 41 allowing a user to input setting conditions or operation commands pertaining to the operation of the self-propelled vacuum cleaner 1, a storage unit 42 storing a travel map 42a, a motor driver 50a for driving the electrically powered fan 50, a motor driver 51a for driving the travel motors 51 for the drive wheels 22L and 22R, a motor driver 52a for driving the brush motor 52 that drives the rotary brush 9 and the side brushes 10, a control unit 18a that controls the floor surface detection sensors 18, a control unit 6a that controls a later-described ultrasonic sensor 6, a control unit 43a that controls a later-described moving object detection unit 43b, and the like.

The control unit 40 is provided with a microcomputer including a CPU, a ROM, and a RAM, and transmits a control signal individually to the motor drivers 50a, 51a, and 52a on the basis of program data stored in advance in the storage unit 42 to perform a drive control of the electrically powered fan 50, the travel motors 51, and the brush motor 52, thereby performing a sequence of cleaning operations. The program data includes program data for a normal mode for cleaning a wide region on the floor surface FL and program data for a wall mode for cleaning along a wall.

In addition, the control unit 40 receives a setting condition and an operation command input by the user through the operation panel 41, and causes the storage unit 42 to store the received result. The travel map 42a stored in the storage unit 42 is information pertaining to travel of the self-propelled vacuum cleaner 1, such as a travel course around the place where the self-propelled vacuum cleaner 1 is installed and a travel speed. The travel map 42a can be stored in the storage unit 42 in advance by the user or can be automatically recorded by the self-propelled vacuum cleaner 1 by oneself during the cleaning operation.

Further, when the self-propelled vacuum cleaner 1 detects an obstacle on the travel course by ultrasonic wave transmitting units $6b_1$ and ultrasonic wave receiving units $6b_2$ shown in FIG. 1 which constitute the ultrasonic sensor 6 or when the self-propelled vacuum cleaner 1 reaches the end of a region to be cleaned, the drive wheels 22L and 22R temporarily stop, and then, the left and right drive wheels 22L and 22R rotate in opposite directions to change the direction. Thus, the self-propelled vacuum cleaner 1 can autonomously travel and perform a cleaning operation around an entire place where it is installed or an entire desired range, while avoiding an obstacle.

When an obstacle is detected in the traveling direction by the ultrasonic sensor 6, the detection signal is transmitted to the control unit 40, and the control unit 40 controls such that the self-propelled vacuum cleaner 1 is stopped or changes the direction.

On the other hand, when an obstacle is not detected by the ultrasonic sensor 6 while the self-propelled vacuum cleaner 1 is traveling, the bumper $2c_1$ collides against the obstacle. When the moving object detection unit 43b (not shown) provided on the inside of the bumper $2c_1$ detects that the bumper $2c_1$ collides against the obstacle, the detection signal is transmitted to the control unit 40, and the control unit 40 controls such that the self-propelled vacuum cleaner 1 is stopped or changes the direction.

Moving object detection units 43b corresponding respectively to a bumper (left bumper $2c1L$) on the left side of the bumper $2c1$, a bumper (right bumper $2c1R$) on the right side of the bumper $2c1$, and a bumper (central bumper $2c1C$) on the front are provided, and they can detect whether or not an obstacle collides against the left side, the right side, and the front of the housing 2.

The moving object detection units 43b are turned on or off when the bumper $2c1$ is pushed, and the detection distance of the moving detection units 43b is about 5 mm.

The floor surface detection sensors 18 for detecting the floor surface FL are mounted on the center position on the front part, the positions of the left and right side brushes 10, and the center position on the rear part of the bottom plate 2a of the housing 2 shown in FIG. 2 as described above. When the floor surface detection sensors 18 detect a downward level difference DL, the detection signal is transmitted to the control unit 40 described later, and the control unit 40 controls such that the drive wheels 22L and 22R are both stopped. Thus, the self-propelled vacuum cleaner 1 is prevented from falling down the downward level difference DL. In addition, when the floor surface detection sensors 18 detect the downward level difference DL, the control unit 40 may control such that the self-propelled vacuum cleaner 1 travels while escaping from the downward level difference DL.

The floor surface detection sensor 18 on the center on the front part has a detection distance of about several tens of centimeters, and the left and right floor surface detection sensors 18 have a detection distance of about 10 centimeters.

A pair of left and right charging terminals 13 for charging the built-in battery is provided on the front end of the bottom plate 2a of the housing 2. The self-propelled vacuum cleaner 1 which performs a cleaning operation while autonomously traveling around a room returns to a charging station installed in the room after finishing the cleaning operation.

Specifically, the self-propelled vacuum cleaner 1 recognizes the direction where the charging station installed on the floor surface FL is present by detecting, for example, an infrared signal transmitted from the charging station, and autonomously travels, while avoiding an obstacle, to return to the charging station.

Accordingly, the charging terminals 13 on the self-propelled vacuum cleaner 1 are brought into contact with a power supply terminal section provided to the charging station, and the power supply terminal section is connected to a positive-electrode terminal and a negative-electrode terminal of the battery through the charging terminals 13. Thus, the battery is charged.

Note that, basically, the self-propelled vacuum cleaner 1 do not automatically operate but in a stand-by state, when it is charged.

Moreover, the charging station connected to a commercial power supply (socket) is generally installed in a room along a sidewall (SW). The battery supplies electric power to drive control elements such as various motors and the control circuit.

As described above, the self-propelled vacuum cleaner 1 is in contact with the floor surface FL on three points which are the left and right drive wheels 22L and 22R and the rear wheel 26, and the weight of the self-propelled vacuum cleaner 1 is distributed in such a balance that loss of contact of the rear wheel 26 with the floor surface FL is prevented even when the self-propelled vacuum cleaner 1 suddenly stops while moving forward.

Therefore, even when suddenly stopping in front of the downward level difference DL while moving forward, the self-propelled vacuum cleaner 1 is prevented from falling down the downward level difference DL by leaning forward due to the sudden stop. Notably, each of the drive wheels 22L and 22R is formed by inserting, into a wheel, a rubber tire which has a tread pattern (groove) formed on a contact area to prevent the drive wheels 22L and 22R from slipping even when the self-propelled vacuum cleaner 1 suddenly stops.

The suction opening 31 is a recessed open surface formed on the bottom surface (lower surface of the bottom plate 2a) of the housing 2 so as to face the floor surface FL. The rotary brush 9 rotating around a horizontal axis parallel to the bottom surface of the housing 2 is provided in the recess, and the side brushes 10 rotating around an axis perpendicular to the bottom surface of the housing 2 are provided on both the left and right sides of the recess. The rotary brush 9 is formed of brushes erected in a spiral manner on the outer peripheral surface of a roller serving as a rotary shaft. Each of the side brushes 10 is formed by providing brush bundles in a radial manner on the lower end of a rotary shaft. The rotary shaft of the rotary brush 9 and the rotary shafts of the pair of side brushes 10 are pivotally supported to a portion of the bottom plate 2a of the housing 2, and connected so as to be rotatable to the brush motor 52 provided in the vicinity thereof through a power transmission mechanism including a pulley and a belt.

In the housing 2, a suction path is formed between the suction opening 31 and the dust-collecting box 15a, and an exhaust path is formed between the dust-collecting box 15a and the exhaust opening 32.

As shown in FIG. 4, air containing dust suctioned into the housing 2 through the suction opening 31 is guided into the dust-collecting box 15a through the suction path and a suction opening $15a_1$ of the dust-collecting box 15a as indicated by an arrow A. At that time, the rotary brush 9 rotates to sweep up dust on the floor surface FL into the suction opening 31, and the pair of side brushes 10 rotates to collect dust present on the right and left of the suction opening 31 into the suction opening 31.

After dust is collected in the dust-collecting box 15a, air from which dust is removed through the filter 15b is discharged to the outside from the exhaust opening 32 through a discharge opening $15a_2$ of the dust-collecting box 15a, a duct 114 connected to the discharge opening $15a_2$, and the electrically powered fan 50 and the exhaust path 34 connected to the duct 114, as indicated by an arrow B. Note that, in FIG. 4, a cover 15c of the dust-collecting box 15a covers the filter 15b.

The self-propelled vacuum cleaner 1 moves forward by forward rotations of the left and right drive wheels 22L and 22R in the same direction, moves backward by reverse rotations in the same direction, and turns when the left and right drive wheels 22L and 22R rotate in opposite directions. For example, when reaching the end of the region to be cleaned or when colliding against an obstacle on a travel course, the self-propelled vacuum cleaner 1 stops the drive wheels 22L and 22R, and then, rotates the left and right drive wheels 22L and 22R by amounts of rotation different from each other to change the direction. Thus, the self-propelled vacuum cleaner 1 can autonomously travel around a place where it is installed or an entire desired region, while efficiently avoiding an obstacle.

<Bumper $2c_1$, Collision Detection Unit 43, and Configuration Around Bumper $2c_1$ and Collision Detection Unit 43>

As shown in FIG. 1, the semicircular bumper $2c_1$ has circular holes formed on the central position in the circumferential direction and on a plurality of positions on each the left and right sides of the central position, and ultrasonic wave transmitting units $6b_1$ and ultrasonic wave receiving units $6b_2$ of the ultrasonic sensor 6 are provided on the inner surface of the bumper $2c_1$ so as to be exposed from the respective holes. In the first embodiment, five holes are formed on the bumper $2c_1$ in line. The ultrasonic wave receiving units $6b_2$ are disposed in the holes on the central position and on both left and right ends, and the ultrasonic wave transmitting units $6b_1$ are disposed in two holes adjacent to the central position.

A control unit 6a (FIG. 3) causes the ultrasonic wave transmitting unit $6b_1$ of the ultrasonic sensor 6 to emit an ultrasonic wave, calculates the distance to an obstacle on the basis of a time from when the transmitted ultrasonic wave is reflected on the obstacle till the reflected wave is received by the ultrasonic wave receiving unit $6b_2$, and transmits the calculated distance to the control unit 40 as a detection signal.

The bumper $2c_1$ is fitted to the peripheral edge of a front opening $2x_1$ of the housing main body $2x$ constituted by the ends of the bottom plate 2a, the top plate 2b, and the rear side plate $2c_2$ so as to cover the front opening $2x_1$. In this case, the bumper $2c_1$ is supported by a fitting structure which is movable in the front-rear direction and in the left-right direction relative to the housing main body $2x$ and does not fall from the front opening $2x_1$.

<Cleaning Operation Procedure of Self-Propelled Vacuum Cleaner 1 while Autonomously Traveling>

Next, the cleaning operation procedure of the self-propelled vacuum cleaner 1 will be described with reference to FIGS. 6 to 10.

Figure 7:
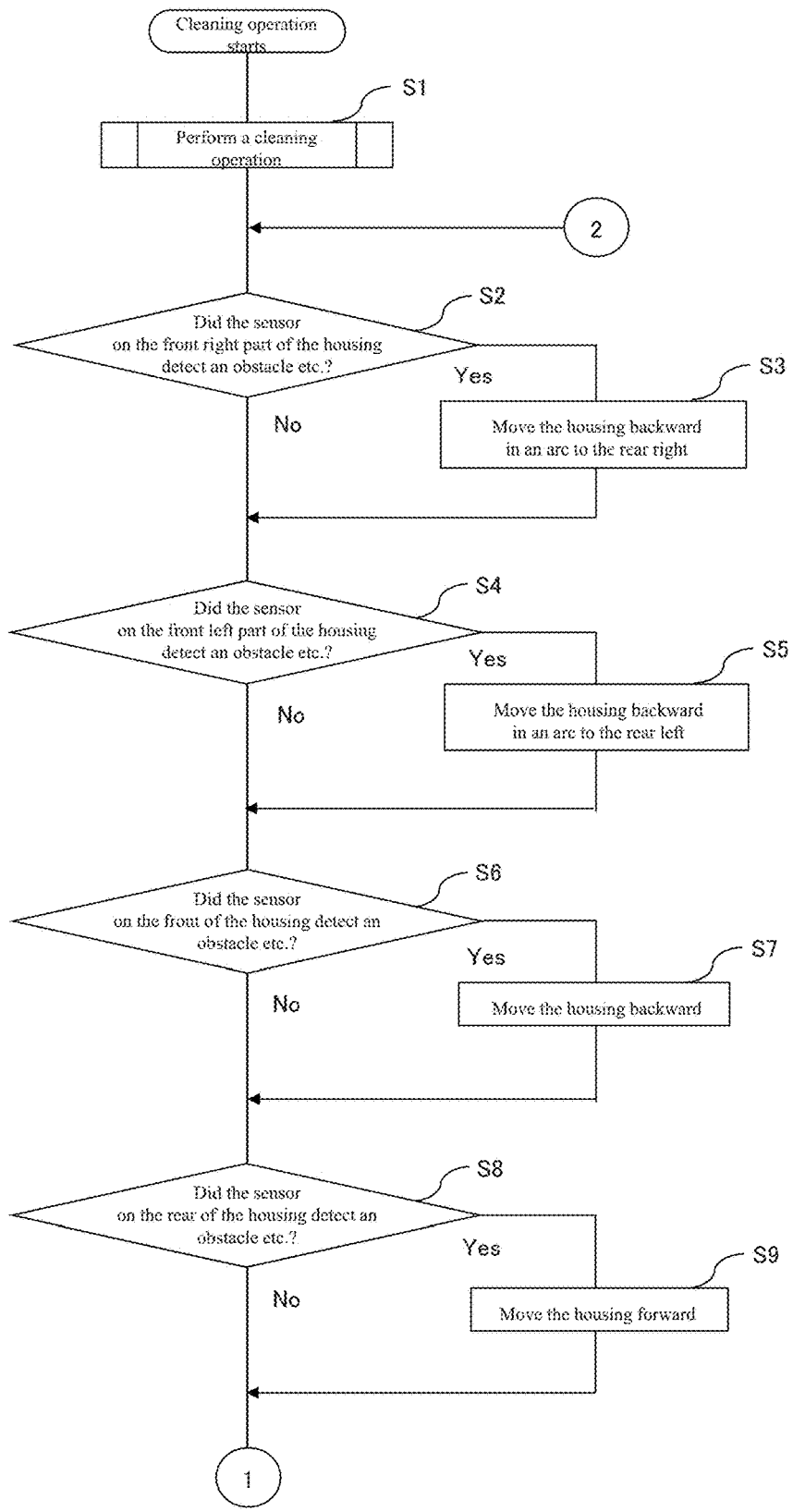
FIG. 7 is a flowchart showing a cleaning operation process of the self-propelled vacuum cleaner shown in FIG. 1.
Figure 8:
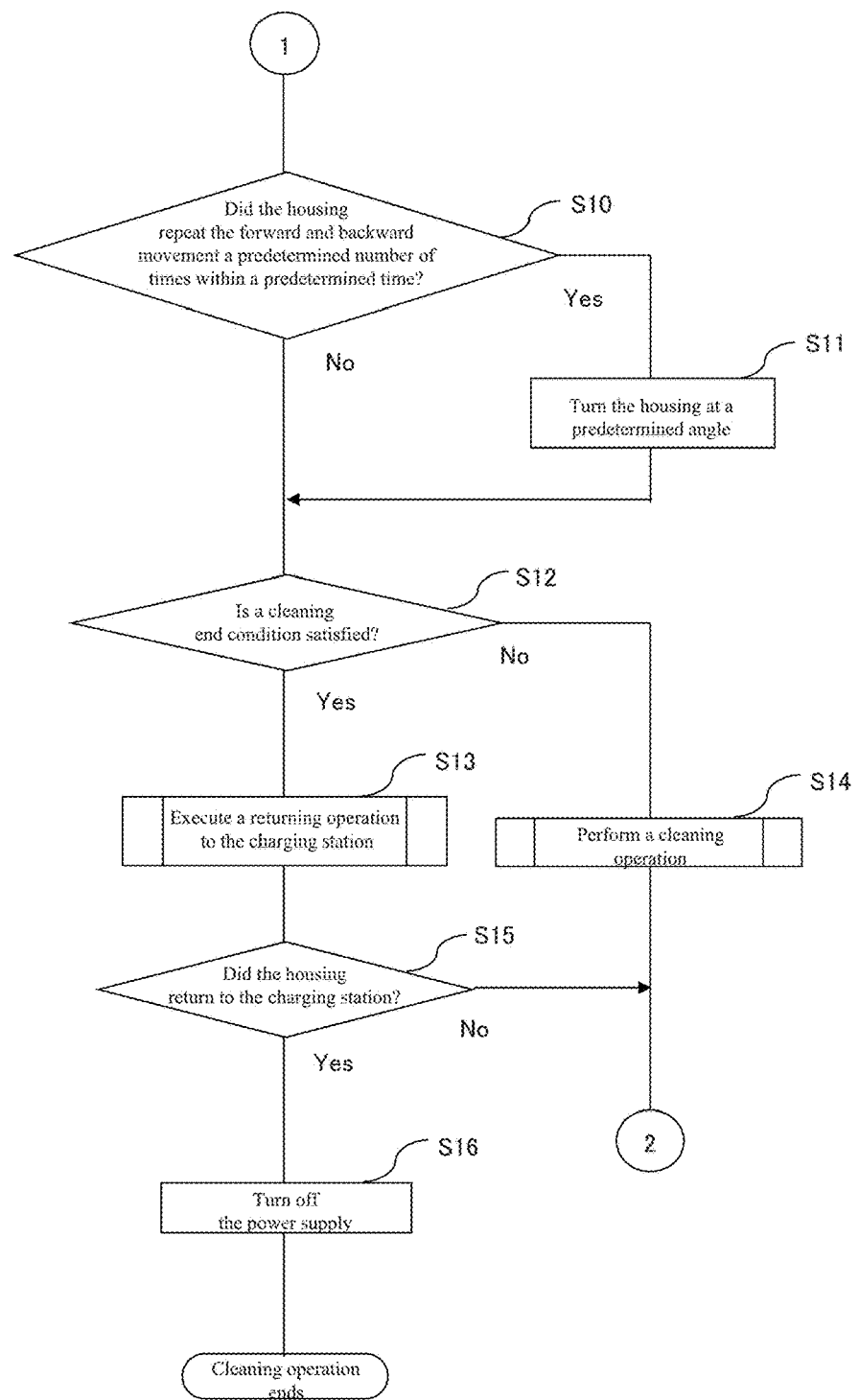
FIG. 8 is a flowchart showing a cleaning operation process of the self-propelled vacuum cleaner shown in FIG. 1.

FIG. 6 is an explanatory view showing one example of an escaping operation of a conventional self-propelled vacuum cleaner 1 from an obstacle and a downward level difference DL. FIGS. 7 and 8 are flowcharts showing the cleaning operation process of the self-propelled vacuum cleaner 1 according to the present invention. FIG. 9 is an explanatory view showing one example of an escaping operation of the self-propelled vacuum cleaner 1 shown in FIG. 1 from an obstacle. FIG. 10 is an explanatory view showing one example of an escaping operation of the self-propelled vacuum cleaner 1 shown in FIG. 1 from the downward level difference DL.

Conventionally, the self-propelled vacuum cleaner 1 generally performs an action of moving backward by a predetermined distance when detecting an obstacle ahead while autonomously traveling around, and moving forward by a predetermined distance when detecting the downward level difference DL on the rear of the self-propelled vacuum cleaner 1.

Figure 6A:
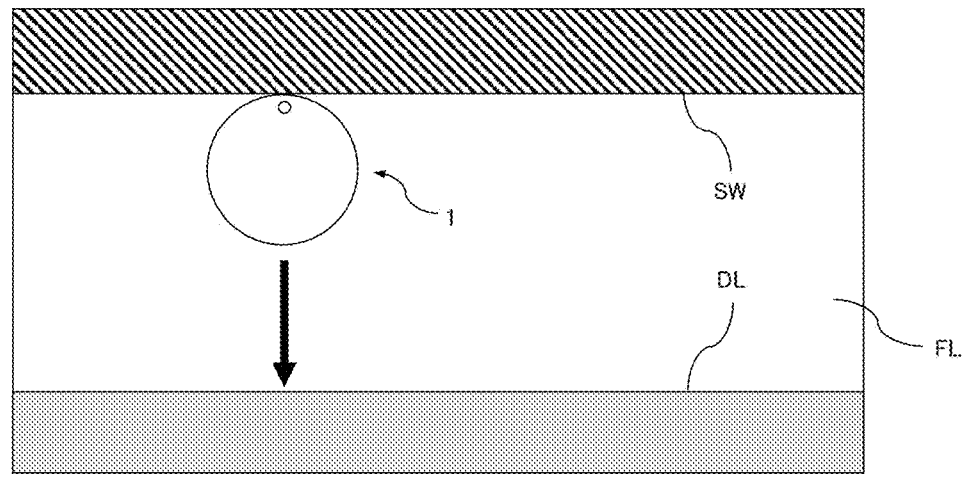
FIG. 6 is an explanatory view showing one example of an escaping operation of a conventional self-propelled vacuum cleaner from an obstacle and a downward level difference.
Figure 6B:
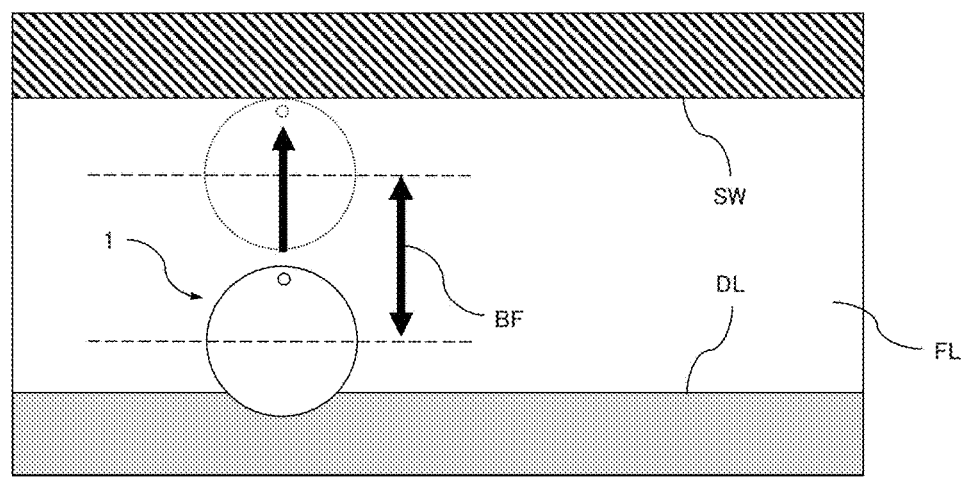

However, as shown in FIG. 6(A), the self-propelled vacuum cleaner 1 may be trapped in a place sandwiched between an obstacle (sidewall SW) present in front of the cleaner 1 and the downward level difference DL present on the rear of the cleaner 1. In this case, as shown in FIG. 6(B), the housing 2 performs a chain reaction of a back-and-forth reciprocating movement BF, which may often cause the self-propelled vacuum cleaner 1 to be difficult to escape.

In order to avoid such a problem, the control unit 40 follows the procedure indicated by the following steps.

In step S1 in FIG. 7, the control unit 40 causes the self-propelled vacuum cleaner 1 to perform a predetermined cleaning operation (step S1).

Specifically, the control unit 40 causes the moving object defection unit 43b to detect an obstacle, while controlling the motor driver 51a such that the housing 2 travels randomly, and further, causes the floor surface detection sensors 18 to detect the downward level difference DL.

Then, in step S2, the control unit 40 determines whether or not the moving object detection unit 43b or the floor surface detection sensor 18 provided on the front right part of the housing 2 detects an obstacle or a downward level difference DL (step S2).

When the moving object detection unit 43b or the floor surface detection sensor 18 provided on the front right part of the housing 2 detects the obstacle or the downward level difference DL (Yes in step S2), the control unit 40 controls the motor driver 51a such that the housing 2 moves backward in an arc to the rear right in step S3 (step S3). Then, the control unit 40 makes determination in step S4 (step S4).

On the other hand, when the moving object detection unit 43b or the floor surface detection sensor 18 provided on the front right part of the housing 2 does not detect the obstacle or the downward level difference DL (No in step S2), the control unit 40 makes the determination in step S4 (step S4).

In this case, "in an arc" means that the drive wheels 22L and 22R are driven such that the amount of rotation of the drive wheel 22L (or 22R) of the left and right drive wheels 22L and 22R is smaller than the amount of rotation of the other drive wheel 22R (or 22L).

Figure 9A:
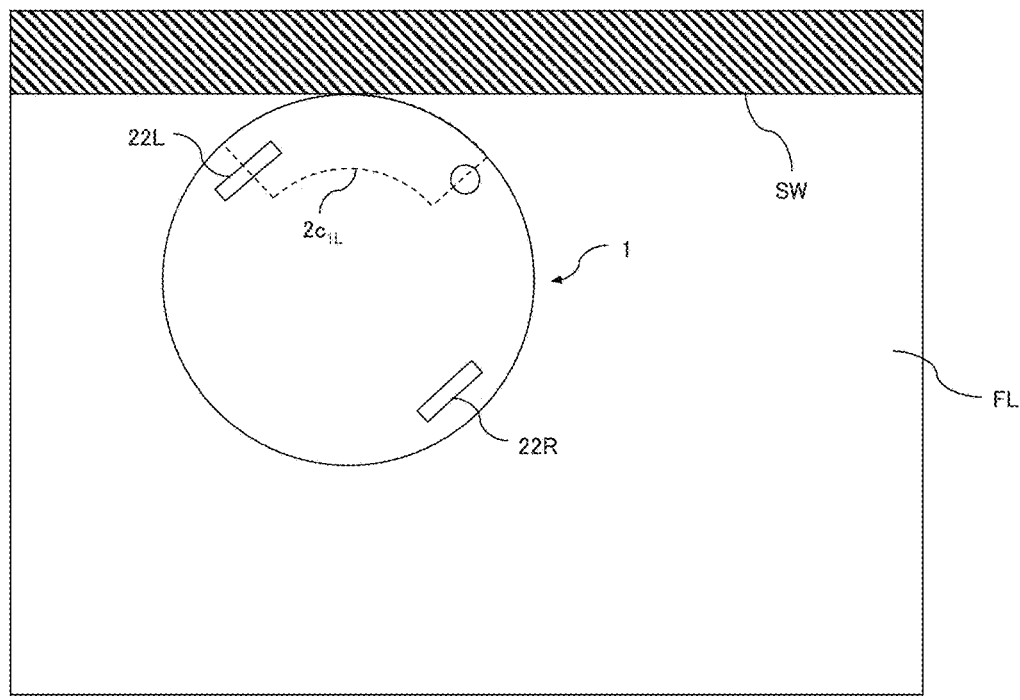
FIG. 9 is an explanatory view showing one example of an escaping operation of the self-propelled vacuum cleaner shown in FIG. 1 from an obstacle.
Figure 9B:
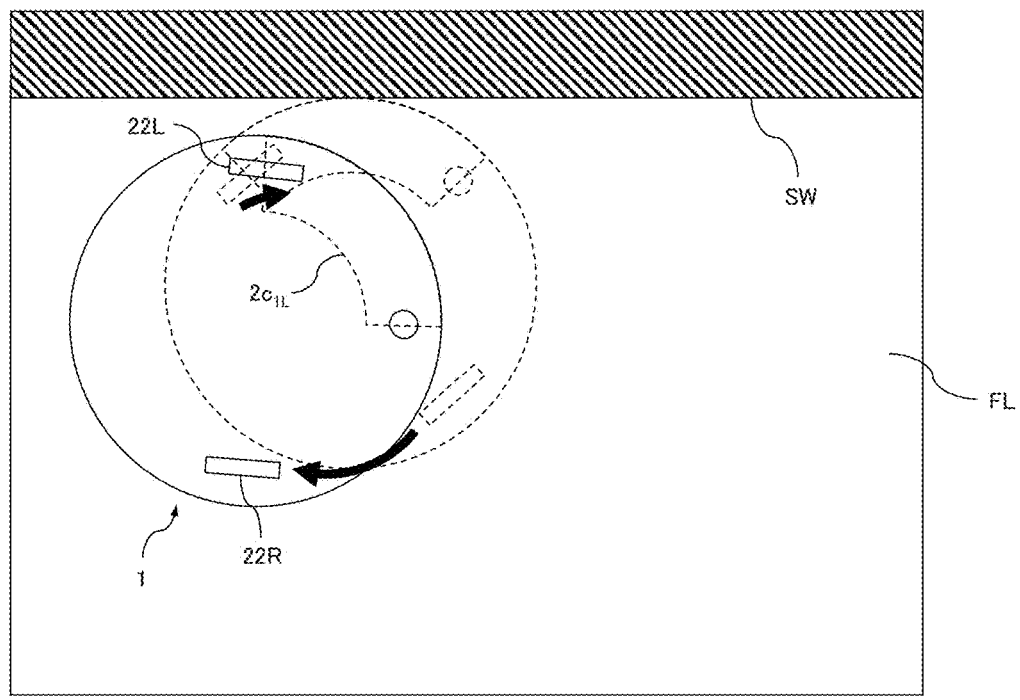

For example, as shown in FIGS. 9(A) and 9(B), when the left part of the bumper $2c_1$ (left bumper $2c_{1L}$) collides against the sidewall SW and the moving object detection unit 43b detects the sidewall SW, the control unit 40 controls the motor driver 51a such that the amount of rotation of the left drive wheel 22L is smaller than the amount of rotation of the right drive wheel 22R.

In FIG. 9(B), the left drive wheel 22L moves forward, and the right drive wheel 22R moves backward, but as a whole, the housing 2 moves backward to the rear left, because the amount of rotation of the left drive wheel 22L is smaller than the amount of rotation of the right drive wheel 22R.

Alternatively, the control unit 40 may control such that the left drive wheel 22L and the right drive wheel 22R both move backward with the amount of rotation of the left drive wheel 22L being smaller than the amount of rotation of the right drive wheel 22R.

On the other hand, when the right part of the bumper $2c_1$ (right bumper $2c_{1R}$) collides against the sidewall SW and the moving object detection unit 43b detects the sidewall SW, the control unit 40 similarly controls the motor driver 51a such that the amount of rotation of the right drive wheel 22R is smaller than the amount of rotation of the left drive wheel 22L.

In this way, without causing the housing 2 to turn in place, the left and right drive wheels 22L and 22R are rotated in different amounts of rotation so that the housing 2 moves away from the sidewall SW in an arc according to the position where the self-propelled vacuum cleaner 1 collides against the obstacle, which can prevent the housing 2 and the sidewall SW from being damaged.

Figure 10A:
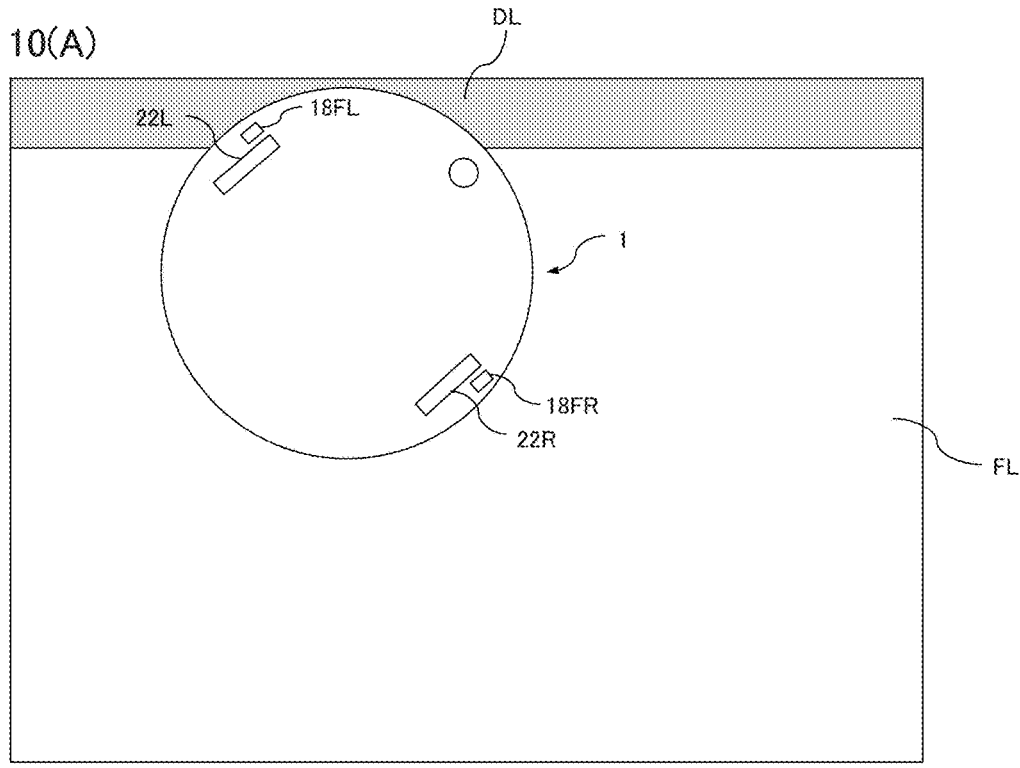
FIG. 10 is an explanatory view showing one example of an escaping operation of the self-propelled vacuum cleaner shown in FIG. 1 from a downward level difference.
Figure 10B:
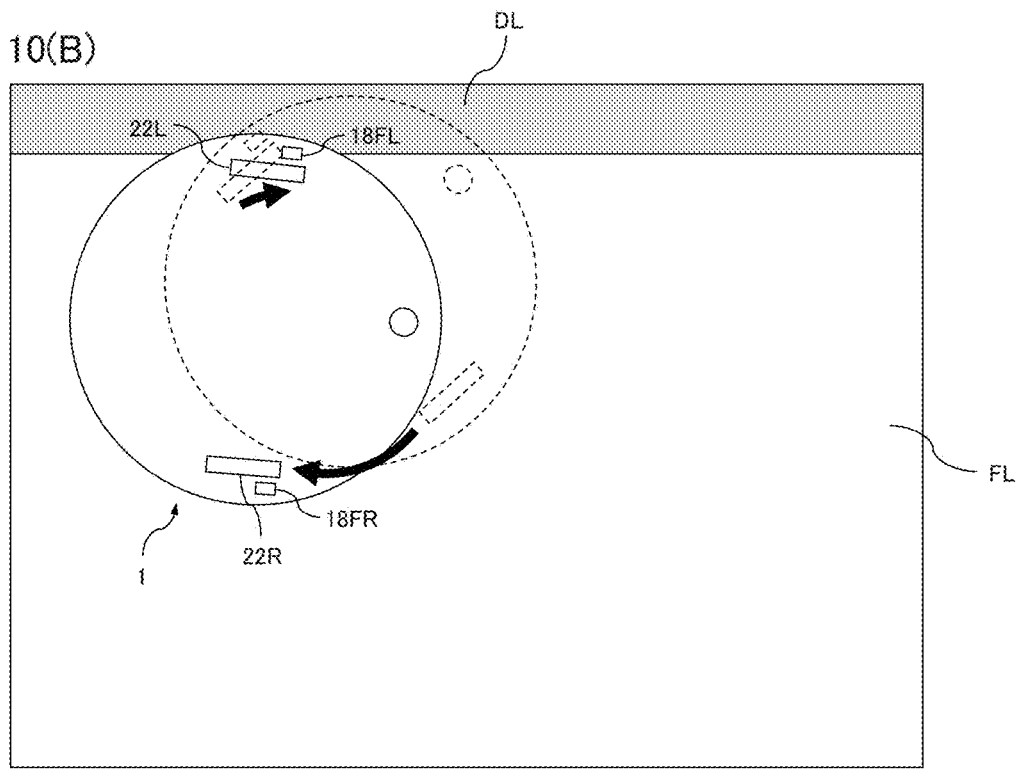

In addition, as shown in FIGS. 10(A) and 10(B), when the floor surface detection sensor 18FL on the front left part detects the downward level difference DL, the control unit 40 also controls the motor driver 51a such that the amount of rotation of the left drive wheel 22L is smaller than the amount of rotation of the right drive wheel 22R.

In FIG. 10(B), the left drive wheel 22L moves forward, and the right drive wheel 22R moves backward, but as a whole, the housing 2 moves backward to the rear left, because the amount of rotation of the left drive wheel 22L is smaller than the amount of rotation of the right drive wheel 22R.

Alternatively, the control unit 40 may control such that the left drive wheel 22L and the right drive wheel 22R both move backward with the amount of rotation of the left drive wheel 22L being smaller than the amount of rotation of the right drive wheel 22R.

On the other hand, when the floor surface detection sensor 18FR on the front right part detects the downward level difference DL, the control unit 40 similarly controls the motor driver 51a such that the amount of rotation of the right drive wheel 22R is smaller than the amount of rotation of the left drive wheel 22L.

In this way, without causing the housing 2 to turn in place, the left and right drive wheels 22L and 22R are rotated in different amounts of rotation so that the housing 2 moves away from the downward level difference DL in an arc according to the position where the downward level difference DL is detected. Thus, the self-propelled vacuum cleaner 1 can escape from the downward level difference DL with the risk of the fall of the housing 2 being reduced.

Next, in step S4, the control unit 40 determines whether or not the moving object detection unit 43b or the floor surface detection sensor 18 provided on the front left part of the housing 2 detects an obstacle or a downward level difference DL (step S4).

When the moving object detection unit 43b or the floor surface detection sensor 18 provided on the front left part of the housing 2 detects the obstacle or the downward level difference DL (Yes in step S4), the control unit 40 controls the motor driver 51a such that the housing 2 moves backward in an arc to the rear left in step S5 (step S5). Then, the control unit 40 makes determination in step S6 (step S6).

On the other hand, when the moving object detection unit 43b or the floor surface detection sensor 18 provided on the front left part of the housing 2 does not detect the obstacle or the downward level difference DL (No in step S4), the control unit 40 makes the determination in step S6 (step S6).

Next, in step S6, the control unit 40 determines whether or not the moving object detection unit 43b or the floor surface detection sensor 18 provided on the front of the housing 2 detects an obstacle or a downward level difference DL (step S6).

When the moving object detection unit 43b or the floor surface detection sensor 18 provided on the front of the housing 2 detects the obstacle or the downward level difference DL (Yes in step S6), the control unit 40 controls the motor driver 51a such that the housing 2 moves backward in step S7 (step S7). Then, the control unit 40 makes determination in step S8 (step S8).

On the other hand, when the moving object detection unit 43b or the floor surface detection sensor 18 provided on the front of the housing 2 does not detect the obstacle or the downward level difference DL (No in step S6), the control unit 40 makes the determination in step S8 (step S8).

Next, in step S8, the control unit 40 determines whether or not the floor surface detection sensor 18 provided on the rear of the housing 2 detects an obstacle or the like (step S8).

When the floor surface detection sensor 18 provided on the rear of the housing 2 detects the obstacle or the like (Yes in step S8), the control unit 40 controls the motor driver 51a such that the housing 2 moves forward in step S9 (step S9). Then, the control unit 40 makes determination in step S10 (step S10).

On the other hand, when the floor surface detection sensor 18 provided on the rear of the housing 2 does not detect the obstacle or the like (No in step S8), the control unit 40 makes the determination in step S10 in FIG. 8 (step S10).

Next, in step S10 in FIG. 8, the control unit 40 determines whether or not the housing 2 repeats the forward movement and the backward movement a predetermined number of times (for example, three times) or more within a predetermined time (for example, 5 seconds) (step S10).

When the housing 2 moves backward the predetermined number of times or more within the predetermined time (Yes in step S10), the control unit 40 turns the housing 2 at a predetermined angle in a predetermined direction (for example, 45 degrees to the right) in step S11 (step S11). Thereafter, the control unit 40 makes determination in step S12 (step S12).

On the other hand, when the housing 2 does not move backward the predetermined number of times or more within the predetermined time (No in step S10), the control unit 40 makes the determination in step S12 (step S12).

Next, in step S12, the control unit 40 determines whether or not a cleaning end condition is satisfied (step S10).

When the cleaning end condition is satisfied (Yes in step S12), the control unit 40 causes the self-propelled vacuum cleaner 1 to execute a returning operation to the charging station in step S13 (step S13). Then, the control unit 40 makes determination in step S15 (step S15).

On the other hand, when the cleaning end condition is not satisfied (No in step S12), the control unit 40 continues the cleaning operation in step S14 (step S14). Thereafter, the control unit 40 repeats the determination in step S2 (step S2).

Next, in step S15, the control unit 40 determines whether or not the housing 2 returns to the charging station (step S15).

When the housing 2 returns to the charging station (Yes in step S15), the control unit 40 turns off the power supply of the self-propelled vacuum cleaner 1 (step S13) to end the cleaning operation in step S16.

On the other hand, when the housing 2 does not return to the charging station (No in step S15), the control unit 40 repeats the determination in step S2 (step S2).

As described above, with the configuration in which the drive wheels 22L and 22R are driven such that the amount of rotation of one of the left and right drive wheels 22L and 22R is smaller than the amount of rotation of the other, the self-propelled vacuum cleaner 1 can perform the escaping operation without giving damage to both the housing 2 and the obstacle. In addition, if the downward level difference DL is detected, the self-propelled vacuum cleaner 1 can perform the escaping operation with the risk of the fall of the housing 2 being reduced.

Moreover, when the housing 2 performs the backward movement the predetermined number of times or more within the predetermined time, the housing 2 turns at a predetermined angle, whereby the self-propelled vacuum cleaner 1 can free oneself from the back and forth reciprocating movement BF.

Second Embodiment

<Escaping Operation of Self-Propelled Vacuum Cleaner 1 from an Obstacle According to the Second Embodiment of the Present Invention>

Next, an escaping operation of the self-propelled vacuum cleaner 1 from an obstacle according to the second embodiment of the present invention will be described with reference to FIG. 11.

FIG. 11 is an explanatory view showing one example of the escaping operation of the self-propelled vacuum cleaner 1 in the present invention from an obstacle.

In the second embodiment, the drive wheels 22L and 22R are driven such that the amount of rotation of one of the left and right drive wheels 22L and 22R becomes zero (that is, one of the left and right drive wheels 22L and 22R stops).

Figure 11A:
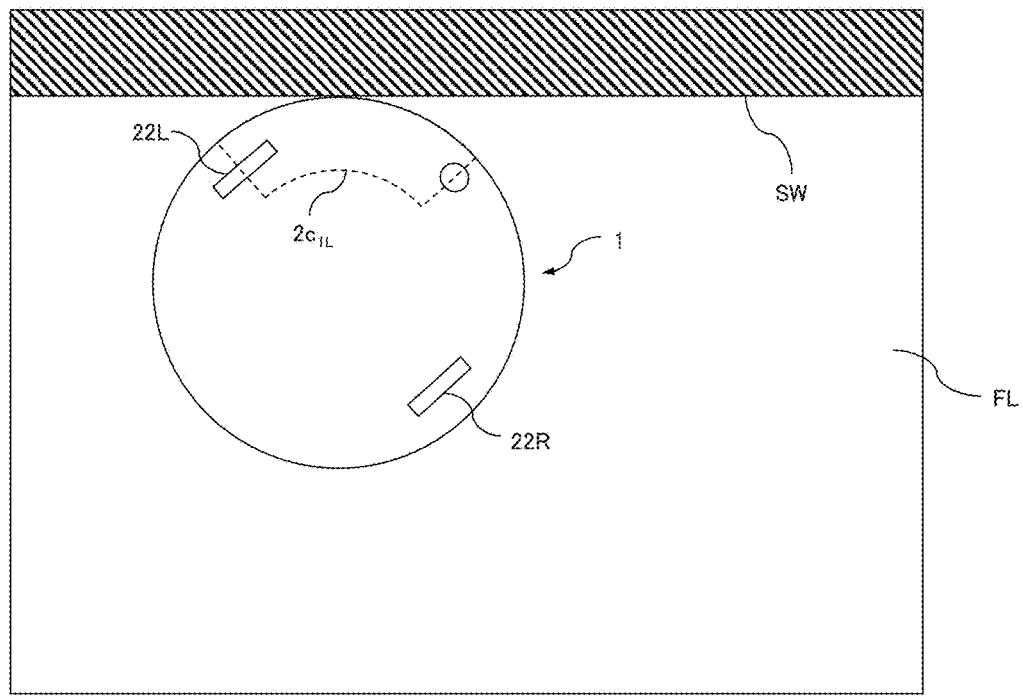
FIG. 11 is an explanatory view showing one example of an escaping operation of the self-propelled vacuum cleaner shown in FIG. 1 from an obstacle.
Figure 11B:
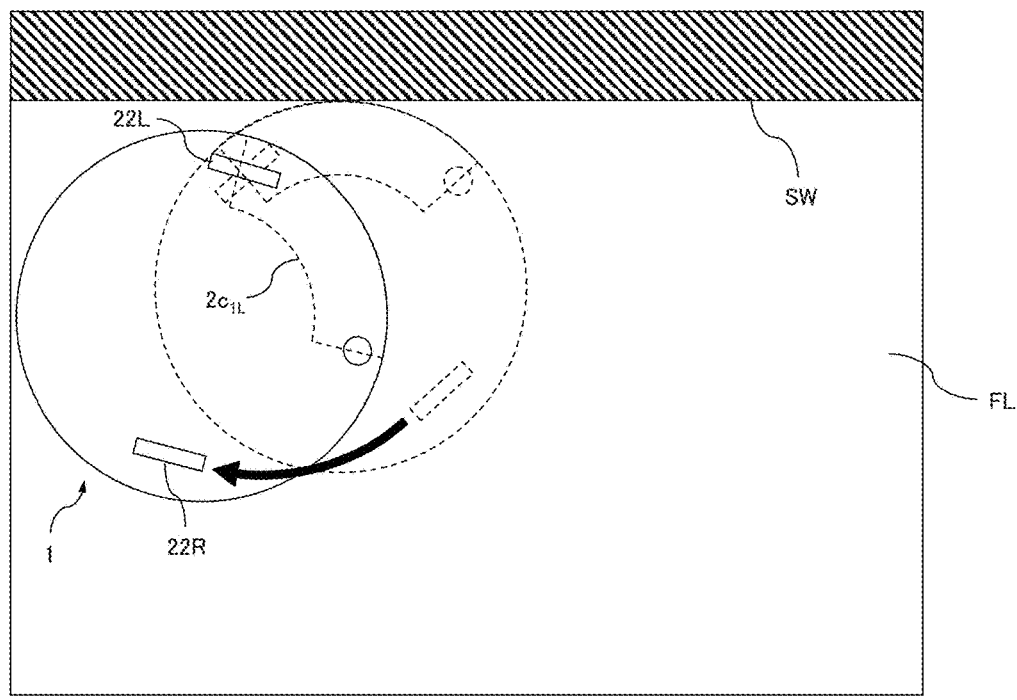

For example, as shown in FIGS. 11(A) and 11(B), when the left part (left bumper) $2c_{1L}$ of the bumper $2c_1$ collides against the sidewall SW and the moving object detection unit 43b detects the sidewall SW, the control unit 40 controls the motor driver 51a such that only the right drive wheel 22R rotates with the amount of rotation of the left drive wheel 22L being zero (that is, with the left drive wheel 22L being stopped), so as to move the housing 2 backward in an arc to the rear right.

According to the control in which the housing 2 moves backward in such a way that only the drive wheel 22L or 22R rotates with the other one being stopped, the turning angle of the housing 2 in escaping from the sidewall SW is increased. Thus, the housing 2 can easily escape from the obstacle.

The same is applied to the escaping operation from the downward level difference DL.

Third Embodiment

<Escaping Operation of Self-Propelled Vacuum Cleaner 1 from Downward Level Difference DL According to the Third Embodiment of the Present Invention>

Next, an escaping operation of the self-propelled vacuum cleaner 1 from the downward level difference DL according to the third embodiment of the present invention will be described with reference to FIG. 12.

FIG. 12 is an explanatory view showing one example of the escaping operation of the self-propelled vacuum cleaner 1 in the present invention from the downward level difference DL.

In the third embodiment, it is supposed that the floor surface detection sensors 18 (floor surface detection sensors 18BL and 18BR) are also provided on the rear left part and the rear right part of the housing 2.

Figure 12A:
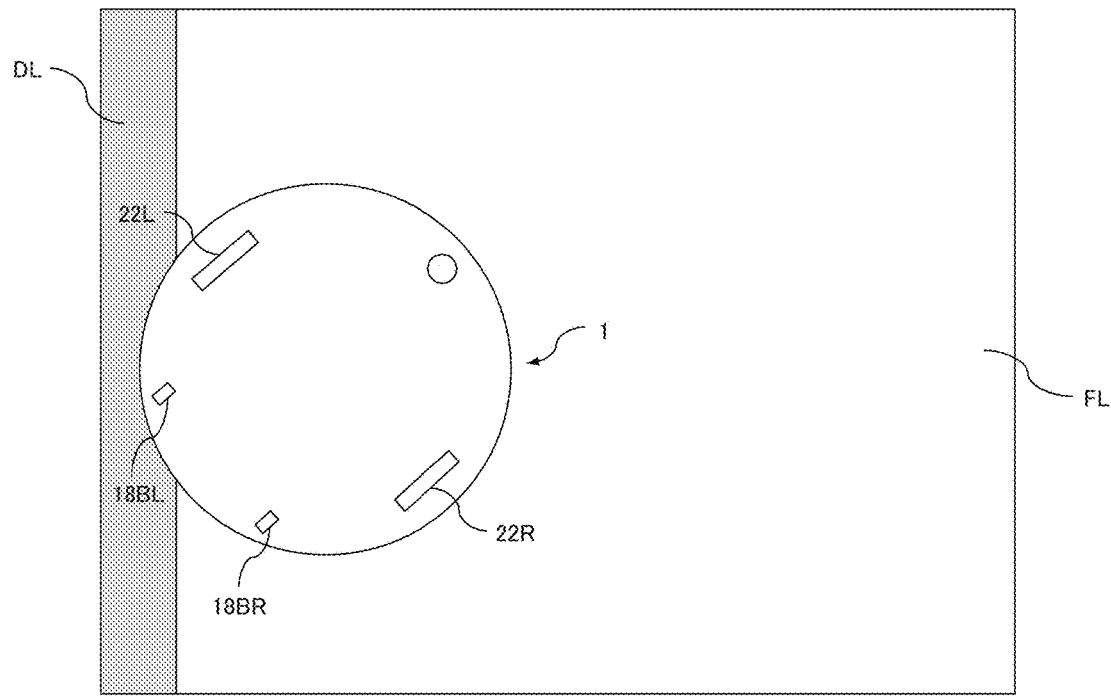
FIG. 12 is an explanatory view showing one example of an escaping operation of the self-propelled vacuum cleaner shown in FIG. 1 from a downward level difference.
Figure 12B:
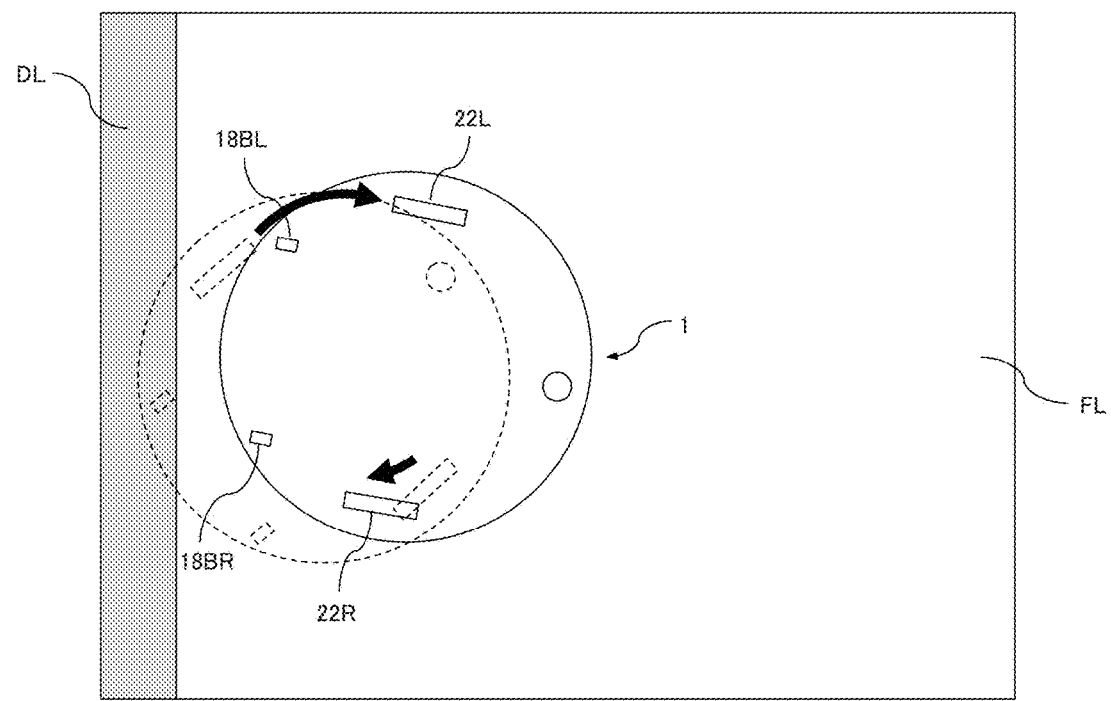

As shown in FIGS. 12(A) and 12(B), when the floor surface detection sensor 18BL on the rear left part of the housing 2 detects the downward level difference DL, the control unit 40 controls the motor driver 51a such that the amount of rotation of the left drive wheel 22L is larger than the amount of rotation of the right drive wheel 22R to move the housing 2 forward.

In FIG. 12(B), the left drive wheel 22L moves forward, and the right drive wheel 22R moves backward, but as a whole, the housing 2 moves forward to the front, right, because the amount of rotation of the left drive wheel 22L is larger than the amount of rotation of the right drive wheel 22R.

Alternatively, the control unit 40 may control such that the left drive wheel 22L and the right drive wheel 22R both move forward with the amount of rotation of the left drive wheel 22L being larger than the amount of rotation of the right drive wheel 22R.

On the other hand, when the floor surface detection sensor 18BR on the right rear part of the housing 2 detects the downward level difference DL, the control unit 40 similarly controls the motor driver 51a such that the amount of rotation of the right drive wheel 22R is larger than the amount of rotation of the left drive wheel 22L to move the housing 2 forward.

According to this configuration, even when the self-propelled vacuum cleaner 1 is trapped in an environment sandwiched between regions where there is an obstacle or a downward level difference DL, in front and rear or on the right and left of the cleaner 1, for example, the housing 2 moves away from the downward level difference DL in an arc, whereby the reciprocating movement BF is difficult to occur, and thus, the self-propelled vacuum cleaner 1 can easily escape from the downward level difference DL.

Fourth Embodiment

Next, an escaping operation of a self-propelled vacuum cleaner 1 according to the fourth embodiment of the present invention from an obstacle and a downward level difference DL will be described with reference to FIGS. 13 and 14.

FIGS. 13 and 14 are explanatory views showing one example of an escaping operation of the self-propelled vacuum cleaner 1 shown in FIG. 1 on a staircase landing.

Figure 13A:
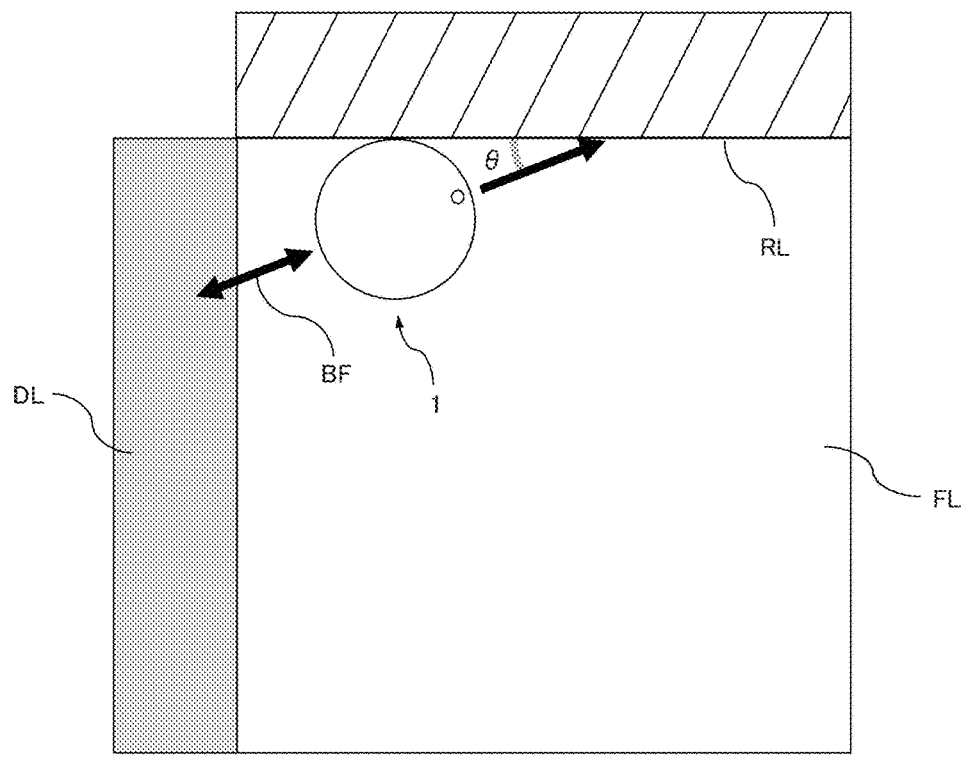
FIG. 13 is an explanatory view showing one example of an escaping operation of the self-propelled vacuum cleaner shown in FIG. 1 from a staircase landing.
Figure 13B:
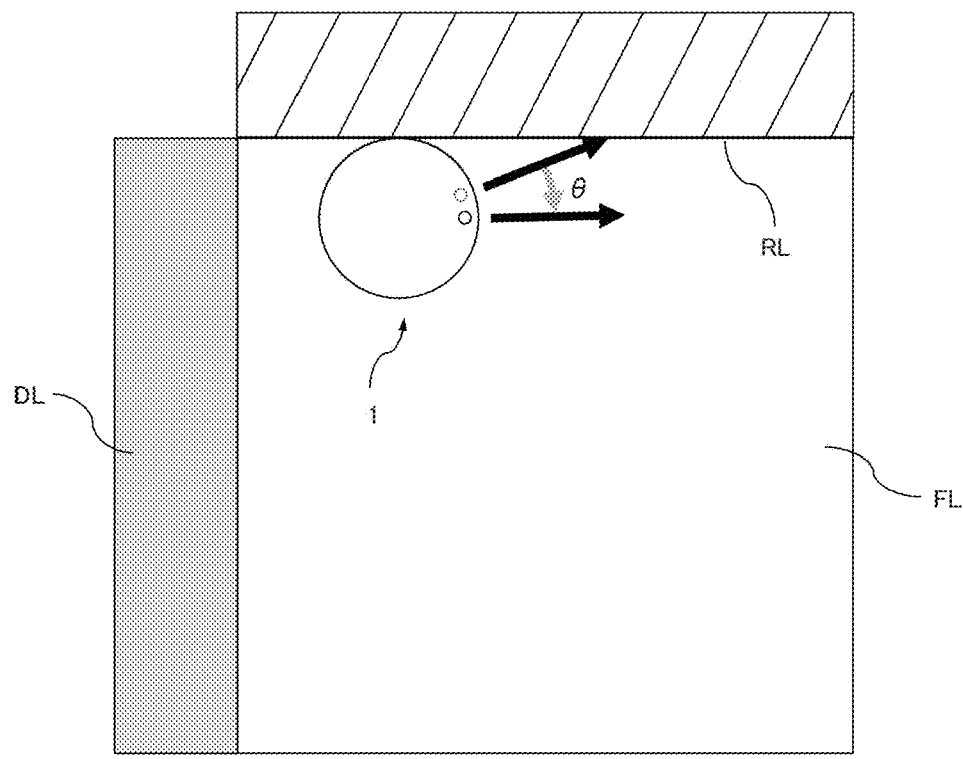

When an angle of entry (incidence angle) θ of the housing 2 relative to an upward level difference (upward step) RL is small as shown in FIG. 13(A), the minimum angle (equal to θ) at which the housing 2 needs to execute a change in direction until the self-propelled vacuum cleaner 1 can free oneself from the collision against the upward level difference RL is also small as shown in FIG. 13(B).

Figure 14A:
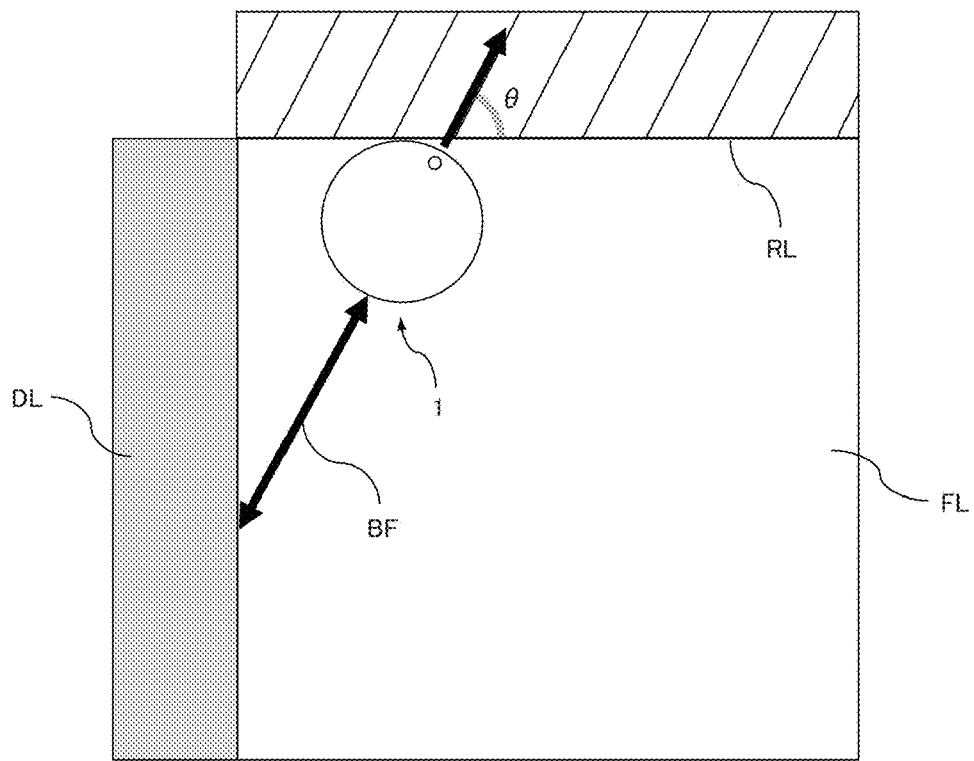
FIG. 14 is an explanatory view showing one example of an escaping operation of the self-propelled vacuum cleaner shown in FIG. 1 from a staircase landing.
Figure 14B:
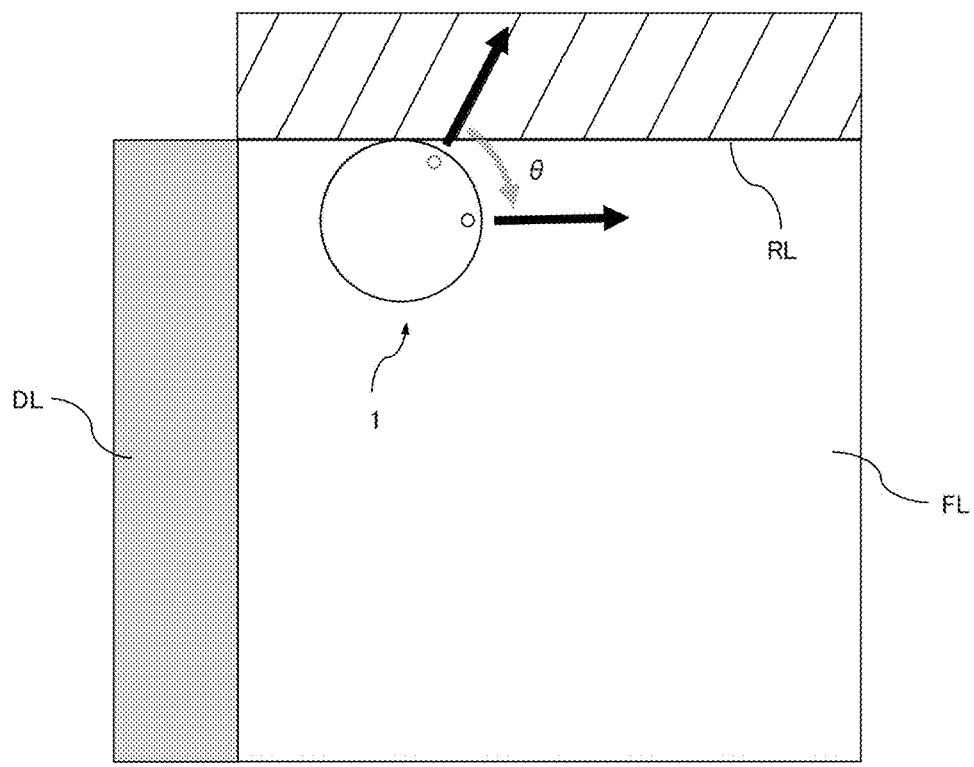

On the other hand, when the angle of entry (incidence angle) θ of the housing 2 relative to the upward level difference (upward step) RL is increased as shown in FIG. 14(A), the minimum angle (equal to θ) at which the housing 2 needs to execute a change in direction until the self-propelled vacuum cleaner 1 can free oneself from the collision against the upward level difference RL is also increased as shown in FIG. 14(B).

Therefore, if the angle of entry θ is small as shown in FIG. 13, the self-propelled vacuum cleaner 1 can free oneself from the collision against the upward level difference RL with less reciprocating movement BF than the case where the angle of entry θ is large as shown in FIG. 14.

On the other hand, when the angle of entry θ is large as shown in FIG. 14, the self-propelled vacuum cleaner 1 has to make the reciprocating movement BF many times between the upward level difference RL and the downward level difference DL until it can free oneself from the collision against the upward level difference RL.

In view of this, in the fourth embodiment, every time the number of times of the back-and-forth movement of the housing 2 reaches a predetermined number of times, the amount of rotation of the drive wheel 22L (22R) which has a larger amount of rotation during the escaping operation is increased.

Specifically, when the self-propelled vacuum cleaner 1 which is trapped between the upward level difference RL and the downward level difference DL repeats the back-and-forth reciprocating movement BF of the housing 2 a predetermined number of times, the control unit 40 increases the amount of rotation of the drive wheel 22R as shown in Table 1 below.

Table 1 shows one example of ratios in amounts of rotation between the drive wheels 22L and 22R during the escaping operation of the housing 2, when the moving object detection unit 43b detects an obstacle at front left of the housing 2 or when the floor surface detection sensor 18 detects a downward level difference DL at front left of the housing 2.

TABLE 1

| Number of times of back-and-forth movement of housing 2 | Amount of rotation of left drive Wheel 22L | Amount of rotation of right drive wheel 22R |
|---|---|---|
| 1-10 | 1 | 3 |
| 11-20 | 1 | 4 |
| 21-30 | 1 | 5 |

Table 1 shows the amount of rotation of the right drive wheel 22R relative to the amount of rotation of the left drive wheel 22L being defined as 1.

In addition, Table 2 shows another example of ratios in amounts of rotation between the drive wheels 22L and 22R during the escaping operation of the housing 2, when the moving object detection unit 43b detects an obstacle at front left of the housing 2 or when the floor surface detection sensor 18 detects a downward level difference DL at front left of the housing 2.

TABLE 2

| Number of times of back-and-forth movement of housing 2 | Amount of rotation of left drive Wheel 22L | Amount of rotation of right drive wheel 22R |
|---|---|---|
| 1-10 | 1.2 | 3 |
| 11-20 | 1.4 | 4 |
| 21-30 | 1.6 | 5 |

According to this configuration, even when being trapped in an environment, such as in a staircase landing, where the back-and-forth reciprocating movement BF of the housing 2 is easy to occur, the self-propelled vacuum cleaner 1 can easily escape from this environment.

Other Embodiments

1. In the first to fourth embodiments, the control unit 40 may control the motor driver 51a such that the escaping operation of the housing 2 is implemented by combining the escaping operation by means of a forward movement and the escaping operation by means of a backward movement (Fifth Embodiment).

According to this configuration, a more efficient escaping operation can be implemented, in comparison to the case where the escaping operation only by means of the forward movement of the housing 2 is performed or the escaping operation only by means of the backward movement of the housing 2 is performed.

2. In the first to fifth embodiments, when the housing 2 performs the back-and-forth reciprocating movement BF a predetermined number of times (for example, 30) or more within a predetermined time (for example, 1 minute), notification regarding this situation may be issued after the operation of the self-propelled vacuum cleaner 1 is stopped (Sixth Embodiment).

According to this configuration, the self-propelled vacuum cleaner 1 can be implemented which provides, to the user, notification regarding that the self-propelled vacuum cleaner 1 is in a situation of being unable to escape, without consuming electricity due to unnecessary travel, when the housing 2 is difficult to escape from the situation of being trapped between regions where there is an obstacle or the downward level difference DL in front and rear or on the left and right thereof, for example.

Note that examples of the specific notification methods include a method for providing notification using sound information, a method for displaying a red indicator, or a method for transmitting error information to a mobile terminal of the user, such as a smartphone or a tablet.

As described above, (i) the self-propelled electronic device according to the present invention comprises: a housing; drive wheels that enable the housing to travel; a travel control unit that controls travel of the housing; and a periphery detection sensor that detects a region around the housing where the device is unable to travel, wherein the drive wheels include a left drive wheel and a right drive wheel which are independently driven, and the travel control unit: causes the left drive wheel and the right drive wheel to move backward in such a manner that an amount of rotation of the left drive wheel is smaller than an amount of rotation of the right drive wheel, when the periphery detection sensor detects that there is a region where the device is unable to travel at front left of the housing; and causes the left drive wheel and the right drive wheel to move backward in such a manner that an amount of rotation of the right drive wheel is smaller than an amount of rotation of the left drive wheel when the periphery detection sensor detects that there is a region where the device is unable to travel at front right of the housing.

In addition, a travel method for a self-propelled electronic device according to the present invention is a travel method for a self-propelled electronic device that causes a housing to travel using a left drive wheel and a right drive wheel which are independently driven, while avoiding a region around the device where the device is unable to travel, the method comprising: causing the left drive wheel and the right drive wheel to move backward in such a manner that an amount of rotation of the left drive wheel is smaller than an amount of rotation of the right drive wheel, when a region where the device is unable to travel is detected at front left of the housing; and causing the left drive wheel and the right drive wheel to move backward in such a manner that an amount of rotation of the right drive wheel is smaller than an amount of rotation of the left drive wheel, when a region where the device is unable to travel is detected at front right of the housing.

In the present invention, the "self-propelled electronic device" executes an operation such as a cleaning operation, an air purification operation, and an ion generating operation, while traveling. One example of a specific mode of the self-propelled electronic device is a self-propelled vacuum cleaner, for example. The self-propelled vacuum cleaner means a vacuum cleaner which autonomously performs a cleaning operation and which is provided with a housing having a dust-collecting unit inside and a suction opening on a bottom surface, drive wheels for causing the housing to travel, a control unit for controlling the rotation, stop, and the rotational direction of the drive wheels, and the like. One example of the self-propelled vacuum cleaner is shown in the embodiments described above with reference to the drawings.

In addition, the self-propelled electronic device according to the present invention includes not only the self-propelled vacuum cleaner but also, for example, a self-propelled air purifier that suctions air and exhausts purified air, a self-propelled ion generator that generates ions, a device that presents information or the like necessary for a user, and a self-propelled robot that can meet the requirement of the user.

The "region where the device is unable to travel" indicates a region around the self-propelled electronic device where there is an obstacle such as a wall, furniture, or an upward level difference (upward step), or a region where the self-propelled electronic device cannot travel (is difficult to travel), such as a region where there is a cliff or a downward level difference (downward step).

In addition, the "periphery detection sensor" indicates an obstacle sensor for detecting an obstacle around the self-propelled electronic device, such as a wall, furniture, or an upward level difference (upward step), and a floor surface detection sensor for detecting a floor surface.

For example, the periphery detection sensor is a sensor including ultrasonic sensors or infrared distance measuring sensors mounted on the respective parts of the housing of the self-propelled electronic device.

In addition, the self-propelled electronic device may be configured to include a camera mounted thereto and detect an obstacle or a downward level difference by analyzing an image captured by the camera. Further, the configurations described above may be combined to one another.

Note that, if the floor surface detection sensor does not detect a floor surface around the housing, it is determined that the floor surface detection sensor detects a cliff or a downward level difference.

Preferable modes of the present invention will further be described.

(ii) In the self-propelled electronic device according to the present invention, when the periphery detection sensor detects that there is a region where the device is unable to travel at front left of the housing, the travel control unit may cause the left drive wheel and the right drive wheel to move backward in such a manner that an amount of rotation of the left drive wheel becomes zero, and when the periphery detection sensor detects that there is a region where the device is unable to travel at front right of the housing, the travel control unit may cause the left drive wheel and the right drive wheel to move backward in such a manner that an amount of rotation of the right drive wheel becomes zero.

According to this configuration, the housing is moved backward with one of the drive wheels being not rotated (that is, being stopped) and only the other one being rotated, whereby a turning angle of the housing when escaping from the region where the device is unable to travel is increased. Thus, the housing can easily escape from the region where the device is unable to travel.

(iii) In the self-propelled electronic device according to the present invention, the travel control unit may cause the left drive wheel and the right drive wheel to move forward in such a manner that an amount of rotation of the right drive wheel is smaller than an amount of rotation of the left drive wheel, when the periphery detection sensor detects that there is a region where the device is unable to travel at rear left of the housing, and the travel control unit may cause the left drive wheel and the right drive wheel to move forward in such a manner that an amount of rotation of the right drive wheel is smaller than an amount of rotation of the left drive wheel, when the periphery detection sensor detects that there is a region where the device is unable to travel at rear right of the housing.

According to this configuration, even when the region where the device is unable to travel is detected at rear left and rear right of the housing, the self-propelled electronic device can efficiently escape from this region.

(iv) In the self-propelled electronic device according to the present invention, when the periphery detection sensor detects that there is a region where the device is unable to travel at rear left of the housing, the travel control unit may cause the left drive wheel and the right drive wheel to move forward in such a manner that an amount of rotation of the right drive wheel becomes zero, and when the periphery detection sensor detects that there is a region where the device is unable to travel at rear right of the housing, the travel control unit may cause the left drive wheel and the right drive wheel to move forward in such a manner that an amount of rotation of the right drive wheel becomes zero.

According to this configuration, the housing is moved forward with one of the drive wheels being not at all rotated (that is, being stopped) and only the other one being rotated, whereby a turning angle of the housing when escaping is increased. Thus, the housing can easily escape from the region where the device is unable to travel.

(v) The self-propelled electronic device according to the present invention may further comprise a notification unit for providing notification regarding predetermined information, wherein the travel control unit may stop the operation of the housing and the notification unit may provide error information, when the number of times of a back-and-forth reciprocating movement of the housing reaches a predetermined number of times or more or when the number of times of a back-and-forth reciprocating movement of the housing reaches a predetermined number of times or more within a predetermined time.

According to this configuration, a self-propelled electronic device can be implemented which can notify a user of error information after being stopped, when it is accidentally trapped in an environment sandwiched between regions where the device is unable to travel in front and rear or on the left and right of the device, for example, and the device is difficult to escape from this environment.

Examples of the method for "notifying the user of error information" include issuing an alarm sound to the user, displaying a red warning lamp on a top surface of the housing or other locations, and transmitting error information to be displayed to a mobile terminal of the user.

(vi) The self-propelled electronic device according to the present invention may further comprise a notification unit for providing notification regarding predetermined information, wherein the travel control unit may cause the housing to change a direction at a predetermined angle, when the number of times of a back-and-forth reciprocating movement of the housing reaches a predetermined number of times or more, or when the number of times of a back-and-forth reciprocating movement of the housing reaches a predetermined number of times or more within a predetermined time.

According to this configuration, a self-propelled electronic device can be implemented which can escape by oneself, when it is accidentally trapped in an environment sandwiched between regions where the device is unable to travel in front and rear or on the left and right of the device, for example, and the device is difficult to escape from this environment.

The preferable modes of the present invention also include modes obtained by combining some of the above-mentioned modes.

Besides the embodiments described above, various modifications are possible for the present invention. These modifications should not be deemed to be out of the scope of the present invention. The present invention should include all the modifications within the scope of the claims, their equivalents, and within the above scope.

DESCRIPTION OF REFERENCE SIGNS

1 Self-propelled vacuum cleaner
2 Housing
$2a$ Bottom plate
$2a_2$ Opening
$2a_4$ Support member
$2b$ Top plate
$2c$ Side plate
$2c_1$ Bumper
$2c_{1L}$ Left bumper
$2c_{1R}$ Right bumper
$2c_2$ Rear side plate
$2s_1$ Intermediate space
$2s_2$ Rear space
$2x$ Housing main body
$2x_1$ Front opening
6 Ultrasonic sensor
$6a$ Control unit
$6b_1$ Ultrasonic wave transmitting unit
$6b_2$ Ultrasonic wave receiving unit
9 Rotary brush
10 Side brush
13 Charging terminal
15 Dust-collecting chamber
$15a$ Dust-collecting box
$15a_1$ Suction opening
$15a_2$ Discharge opening
$15b$ Filter
$15c$ Cover
18, 18BL, 18BR, 18FL, 18FR Floor surface detection sensor
$18a$ Control unit
22L Left drive wheel
22R Right drive wheel
26 Rear wheel
31 Suction opening
32 Exhaust opening
34 Exhaust path
40 Control unit
41 Operation panel
42 Storage unit
$42a$ Travel map
43 Collision detection unit
$43a$ Control unit
$43b$ Moving object detection unit
50 Electrically powered fan
$50a$, $51a$, $52a$ Motor driver
51 Travel motor
52 Brush motor
114 Duct
120 Ion generator
220 Wheel drop sensor
221 Support arm
222 Rotation support shaft
223 Slit
224 Optical sensor
225 Optical signal
A, B Arrow
BF Reciprocating movement
DL Downward level difference
FL Floor surface
RL Upward level difference
SW Sidewall
V Battery voltage
Vth Lower-limit voltage value
UL, UR Drive wheel unit

The invention claimed is:
1. A self-propelled electronic device comprising: a housing; drive wheels that enable the housing to travel; a travel control unit that controls travel of the housing; and a periphery detection sensor that detects a region around the housing where the device is unable to travel,
- wherein the drive wheels include a left drive wheel and a right drive wheel which are independently driven, and
- wherein the travel control unit: causes the left drive wheel and the right drive wheel to move backward in such a manner that an amount of rotation of the left drive wheel is smaller than an amount of rotation of the right drive wheel, when the periphery detection sensor detects that there is a region where the device is unable to travel at front left of the housing; and causes the left drive wheel and the right drive wheel to move backward in such a manner that an amount of rotation of the right drive wheel is smaller than an amount of rotation of the left drive wheel when the periphery detection sensor detects that there is a region where the device is unable to travel at front right of the housing.

2. The self-propelled electronic device according to claim 1, when the periphery detection sensor detects that there is a region where the device is unable to travel at front left of the housing, the travel control unit causes the left drive wheel and the right drive wheel to move backward in such a manner that an amount of rotation of the left drive wheel becomes zero, and when the periphery detection sensor detects that there is a region where the device is unable to travel at front right of the housing, the travel control unit causes the left drive wheel and the right drive wheel to move backward in such a manner that an amount of rotation of the right drive wheel becomes zero.

3. The self-propelled electronic device according to claim 1, the travel control unit causes the left drive wheel and the right drive wheel to move forward in such a manner that an amount of rotation of the right drive wheel is smaller than an amount of rotation of the left drive wheel, when the periphery detection sensor detects that there is a region where the device is unable to travel at rear left of the housing, and the travel control unit causes the left drive wheel and the right drive wheel to move forward in such a manner that an amount of rotation of the right drive wheel is smaller than an amount of rotation of the left drive wheel, when the periphery detection sensor detects that there is a region where the device is unable to travel at rear right of the housing.

4. The self-propelled electronic device according to claim 3, when the periphery detection sensor detects that there is a region where the device is unable to travel at rear left of the housing, the travel control unit causes the left drive wheel and the right drive wheel to move forward in such a manner that an amount of rotation of the right drive wheel becomes zero, and when the periphery detection sensor detects that there is a region where the device is unable to travel at rear right of the housing, the travel control unit causes the left drive wheel and the right drive wheel to move forward in such a manner that an amount of rotation of the right drive wheel becomes zero.

5. The self-propelled electronic device according to any one of claims 1 to 4, further comprising a notification unit for providing notification regarding predetermined information,
- wherein the travel control unit stops the operation of the housing and the notification unit provides error information, when the number of times of a back-and-forth reciprocating movement of the housing reaches a predetermined number of times or more or when the number of times of a back-and-forth reciprocating movement of the housing reaches a predetermined number of times or more within a predetermined time.

6. The self-propelled electronic device according to any one of claims 1 to 4, further comprising a notification unit for providing notification regarding predetermined information,
- wherein the travel control unit causes the housing to change a direction at a predetermined angle, when the number of times of a back-and-forth reciprocating movement of the housing reaches a predetermined number of times or more, or when the number of times of a back-and-forth reciprocating movement of the housing reaches a predetermined number of times or more within a predetermined time.

7. A travel method for a self-propelled electronic device that causes a housing to travel using a left drive wheel and a right drive wheel which are independently driven, while avoiding a region around the device where the device is unable to travel,
- the method comprising: causing the left drive wheel and the right drive wheel to move backward in such a manner that an amount of rotation of the left drive wheel is smaller than an amount of rotation of the right drive wheel, when a region where the device is unable to travel is detected at front left of the housing; and causing the left drive wheel and the right drive wheel to move backward in such a manner that an amount of rotation of the right drive wheel is smaller than an amount of rotation of the left drive wheel, when a region where the device is unable to travel is detected at front right of the housing.

\* \* \* \* \*